(12) United States Patent
Yoshizawa et al.

(10) Patent No.: US 7,984,494 B2
(45) Date of Patent: Jul. 19, 2011

(54) COMPUTER SYSTEM ESTABLISHING A SAFE COMMUNICATION PATH

(75) Inventors: Masahiro Yoshizawa, Kokubunji (JP);
Kazuma Yumoto, Fuchu (JP);
Kazuyoshi Hoshino, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1193 days.

(21) Appl. No.: 11/490,189

(22) Filed: Jul. 21, 2006

(65) Prior Publication Data
US 2007/0113087 A1 May 17, 2007

(30) Foreign Application Priority Data

Nov. 16, 2005 (JP) ................................. 2005-331844

(51) Int. Cl.
*G06F 7/04* (2006.01)
*G06F 15/16* (2006.01)
*G06F 17/00* (2006.01)

(52) U.S. Cl. ......................................................... 726/14
(58) Field of Classification Search ...................... 726/14
See application file for complete search history.

(56) References Cited

U.S. PATENT DOCUMENTS

| | | | |
|---|---|---|---|
| 2003/0149899 A1* | 8/2003 | Boden et al. .................. | 713/201 |
| 2004/0205245 A1* | 10/2004 | Le Pennec et al. ........... | 709/245 |
| 2005/0201370 A1* | 9/2005 | Poyhonen et al. ............ | 370/389 |
| 2006/0209794 A1* | 9/2006 | Bae et al. ...................... | 370/352 |
| 2007/0019545 A1* | 1/2007 | Alt et al. ....................... | 370/230 |
| 2007/0019622 A1* | 1/2007 | Alt et al. ....................... | 370/352 |
| 2007/0019623 A1* | 1/2007 | Alt et al. ....................... | 370/352 |
| 2007/0022289 A1* | 1/2007 | Alt et al. ....................... | 713/168 |
| 2007/0036143 A1* | 2/2007 | Alt et al. ....................... | 370/352 |
| 2007/0078986 A1* | 4/2007 | Ethier et al. .................. | 709/227 |

OTHER PUBLICATIONS

Maughan, D. et al. RFC 2408: Internet Security Association and Key Management Protocol (ISAKMP). Nov. 1998. p. 1-86.*
Aboba, B. et al. RFC 3715: IPSec-Network Address Translation (NAT) compatibility requirements. Mar. 2004. p. 1-17.*
Rescorla, E. RFC 4101: Writing Protocol Models. Jun. 2005. p. 1-23.*
RFC 3489, STUN—Simple Traversal of User Datagram Protocol (UDP) Through Network Address Translators (NATs),by J. Rosenberg, et al. pp. 1-47.

* cited by examiner

*Primary Examiner* — Christian LaForgia
(74) *Attorney, Agent, or Firm* — Brundidge & Stanger, P.C.

(57) ABSTRACT

Provided is a computer system including: a first computer; a second computer including a second processor and a second memory; and a communication controller for controlling communication between the first and second computers, in which: upon reception of a packet from the first computer, the communication controller translates address information of the received packet to transfer the packet to the second computer; the second memory stores SA candidate information as SA information in which a part of the address information is unknown; and the second processor decrypts the packet encrypted by the first computer by using the SA candidate information upon reception of the encrypted packet from the first computer, and creates SA information based on the SA candidate information used for the decryption and the address information of the encrypted packet upon successful decryption of the encrypted packet.

9 Claims, 23 Drawing Sheets

| DIRECTION | SOURCE IP ADDRESS | SOURCE PORT | DESTINATION IP ADDRESS | DESTINATION PORT | PROTOCOL | SPI | KEY DATA | LIFETIME |
|---|---|---|---|---|---|---|---|---|
| inbound | 192.0.2.3 | 80 | 172.16.0.1 | 2345 | TCP | 135... | ABC... | 3600 SECONDS |
| outbound | 172.16.0.1 | 2345 | 192.0.2.3 | 80 | TCP | 246... | CDE... | 3600 SECONDS |
| ⋮ | ⋮ | ⋮ | ⋮ | ⋮ | ⋮ | ⋮ | ⋮ | ⋮ |

SA INFORMATION TABLE OF INITIATOR 2

*FIG. 4*

| DIRECTION | SOURCE IP ADDRESS | SOURCE PORT | DESTINATION IP ADDRESS | DESTINATION PORT | PROTOCOL | SPI | KEY DATA | LIFETIME |
|---|---|---|---|---|---|---|---|---|
| inbound | 192.0.2.4 | 1235 | 192.0.2.3 | 80 | TCP | 246... | CDE... | 3600 SECONDS |
| outbound | 192.0.2.3 | 80 | 192.0.2.4 | 1235 | TCP | 135... | ABC... | 3600 SECONDS |
| ... | ... | ... | ... | ... | ... | ... | ... | ... |

SA INFORMATION TABLE OF RESPONDER 3

FIG. 5

| PAIR ID 3350 | DIRECTION 3351 | SOURCE IP ADDRESS 3352 | SOURCE PORT 3353 | DESTINATION IP ADDRESS 3354 | DESTINATION PORT 3355 | PROTOCOL 3356 | SPI 3357 | KEY DATA 3358 | LIFETIME OF SA 3359 | LIFETIME OF SA CANDIDATE 3360 |
|---|---|---|---|---|---|---|---|---|---|---|
| 1 | inbound | UNDETER-MINED | UNDETER-MINED | 192.0.2.3 | 80 | TCP | 246... | CDE... | 3600 SECONDS | 60 SECONDS |
| 1 | outbound | 192.0.2.3 | 80 | UNDETER-MINED | UNDETER-MINED | TCP | 135... | ABC... | 3600 SECONDS | 60 SECONDS |
| ... | ... | ... | ... | ... | ... | ... | ... | ... | ... | ... |

335 ↙

SA CANDIDATE INFORMATION TABLE

FIG. 6

```
<?xml version="1.0" ?>
<IPsecControl>
    <SA_Initiator>
        <SecurityProtocol>ESP</SecurityProtocol>
        <Mode>Transport</Mode>
        <SPI>24680bdf</SPI>
        <enc>AES-CBC</enc>
        <auth>HMAC-SHA1</auth>
        <Lifetime>
            <size>3600</size>
            <unit>second</unit>
        </Lifetime>
    </SA_Initiator>
    <InitiatorID>
        <IPv4_Addr>172.16.0.1</IPv4_Addr>
        <Protocol>tcp</Protocol>
        <Port>2345</Port>
    </InitiatorID>
    <ResponderID>
        <IPv4_Addr>192.0.2.3</IPv4_Addr>
        <Protocol>tcp</Protocol>
        <Port>80</Port>
    </ResponderID>
    <KeyExchange>
        <OakleyGroup>2</OakleyGroup>
        <dhv1>2037b38646124cbf···cf3298692a69bd30</dhv1>
    </KeyExchange>
</IPsecControl>
```

- POLICY INFORMATION 901
- INITIATOR ADDRESS INFORMATION 902
- RESPONDER ADDRESS INFORMATION 903
- KEY GENERATION INFORMATION 904

FIG. 8

| PAIR ID | STATUS | DIRECTION | SOURCE IP ADDRESS | SOURCE PORT | DESTINATION IP ADDRESS | DESTINATION PORT | PROTOCOL | SPI | KEY DATA | LIFETIME OF SA | LIFETIME OF SA CANDIDATE |
|---|---|---|---|---|---|---|---|---|---|---|---|
| 1 | COMPLETED | inbound | 192.0.2.4 | 1235 | 192.0.2.3 | 80 | TCP | 246... | CDE... | 3600 SECONDS | — |
| 1 | COMPLETED | outbound | 192.0.2.3 | 80 | 192.0.2.4 | 1235 | TCP | 135... | ABC... | 3600 SECONDS | — |
| 2 | CANDIDATE | inbound | UNDETERMINED | UNDETERMINED | 192.0.2.3 | 80 | TCP | 680... | DEF... | 3600 SECONDS | 60 SECONDS |
| 2 | CANDIDATE | outbound | 192.0.2.3 | 80 | UNDETERMINED | UNDETERMINED | TCP | 579... | BCD... | 3600 SECONDS | 60 SECONDS |
| ⋮ | ⋮ | ⋮ | ⋮ | ⋮ | ⋮ | ⋮ | ⋮ | ⋮ | ⋮ | ⋮ | ⋮ |

SA INFORMATION & SA CANDIDATE INFORMATION TABLE

*FIG. 12*

COMPUTER SYSTEM ESTABLISHING A SAFE COMMUNICATION PATH

CLAIM OF PRIORITY

The present application claims priority from Japanese patent application JP2005-331844 filed on Nov. 16, 2005, the content of which is hereby incorporated by reference into this application.

BACKGROUND OF THE INVENTION

This invention relates to a computer system equipped with a plurality of computers, and more particularly to a technology of assuring secrecy and data integrity of communication through a network.

In recent years, internet protocol (hereinafter, abbreviated as "IP") networks have been used in general. Accordingly, importance is attached to a network security technology. Used for assuring security of the IP network is a known technology of establishing a safe communication path, i.e., security association (hereinafter abbreviated as "SA") between computers engaged in communication with each other.

According to the technology of establishing SA, the computers exchange SA information containing an encryption method or an encryption key and establish SA before they start communication. Then, the computers manage the SA information regarding the established SA. The computers carry out packet encryption or decryption based on the managed SA information.

STUN protocol specifications are disclosed in RFC 3489 (retrieved from the Internet at URL: http://www.ieft.org/rfc/rfc3489.tct). According to the specifications, a terminal connected to NAT can predict an address allocated from the NAT by using the STUN protocol to communicate with a STUN server.

SUMMARY OF THE INVENTION

When the computers use SA, the addresses used for communication to establish SA are different from the ones used for communication carried out by the established SA. In this case, if a network address translation (NAT) or a load balancer is present in the communication path between the computers, the computers cannot use SA. Because the computer can not know in advance the addresses to which the addresses used for communication carried out by the established SA will be translated by a NAT or a load balancer.

A technology has been made available to solve this problem. According to this technology, before it establishes SA, the computer reserves an address in the NAT by using a technology such as universal plug and play (UPnP) or simple traversal of UDP through NATs (STUN). Then, the computer notifies the reserved address to another computer of a communication opponent. According to this technology, however, the computer must have a special function such as UPNP.

Under these circumstances, a technology has been made available which causes the computer to use the same address between the communication for establishing SA and the communication carried out by using the established SA. However, this technology cannot be applied to a computer system equipped with a proxy computer for assuring security.

This invention has been made to solve the foregoing problems, and it is an object of the invention to establish SA between computers engaged in communication with each other via NAT or a load balancer.

According to an exemplary embodiment of this invention, there is provided a computer system, comprising: a first computer including a first processor, a first memory, and a first interface; a second computer including a second processor, a second memory, and a second interface; and a communication controller for controlling communication between the first and second computers, wherein: upon reception of a packet from the first computer, the communication controller translates address information of the received packet to transfer the received packet to the second computer; the second memory stores SA candidate information as incomplete SA information in which a part of the address information is unknown; the second processor decrypts the packet encrypted by the first computer by using the SA candidate information upon reception of the encrypted packet from the first computer; and the second processor creates SA information based on the SA candidate information used for the decryption and the address information of the encrypted packet upon successful decryption of the encrypted packet.

According to the exemplary embodiment of this invention, it is possible to establish SA between the computers engaged in communication with each other via the NAT or the load balancer.

BRIEF DESCRIPTION OF THE DRAWINGS

The present invention can be appreciated by the description which follows in conjunction with the following figures, wherein:

FIG. 4 is a diagram showing a structure of the SA information table of the initiator of the first embodiment;

FIG. 5 is a diagram showing a structure of the SA information table of the responder of the first embodiment;

FIG. 6 is a diagram showing a structure of the SA candidate information table of the responder of the first embodiment;

FIG. 8 is an explanatory diagram of the SA information of the first embodiment;

FIG. 12 is a diagram showing a structure of the SA information & SA candidate information of the responder of the second embodiment;

DETAILED DESCRIPTION OF THE PREFERRED EMBODIMENTS

Exemplary embodiments of this invention will be described below with reference to the accompanying drawings.

First Embodiment

Figure 1:
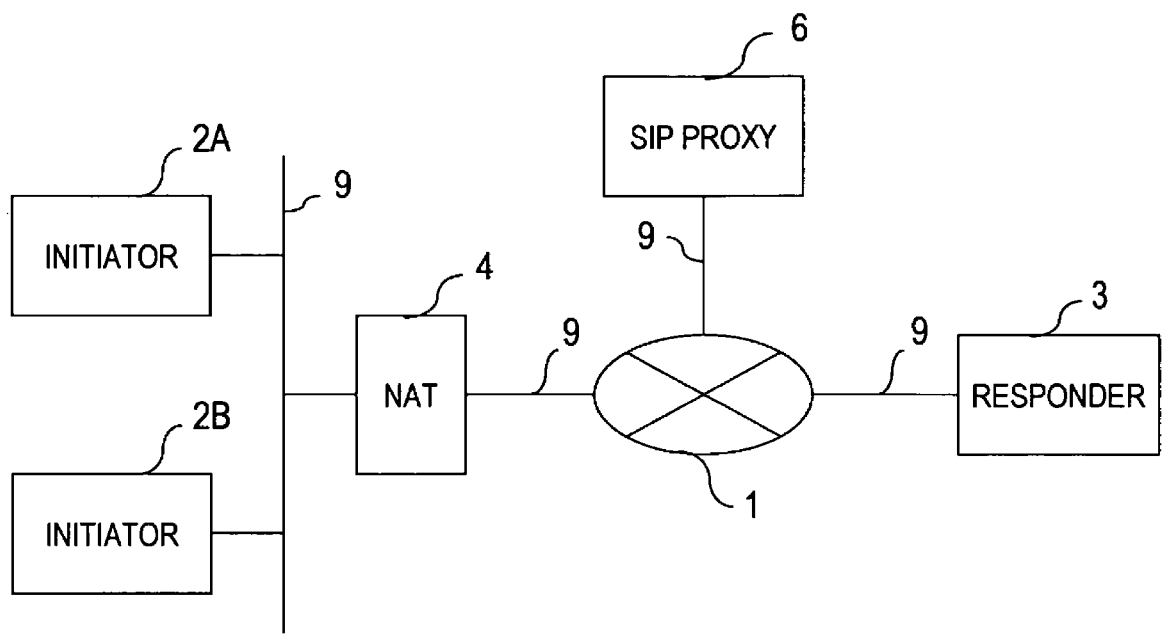
FIG. 1 is a block diagram showing a computer system according to the first embodiment.

FIG. 1 is a block diagram showing a computer system according to the first embodiment.

The computer system includes a communication network 1, initiators 2A, 2B, . . . (hereinafter, sometimes referred to collectively as "initiator 2"), a responder 3, a NAT 4, a SIP proxy 6, and a communication line 9.

As described below referring to FIG. 2, the initiator 2 is a computer which requests the responder 3 to establish security association (hereinafter, abbreviated as "SA").

The SA serves as a safe communication path established between the initiator 2 and the responder 3. The SA of the embodiment includes not only a security parameter for encryption but also a security policy equivalent to IPsec security policy.

As described below referring to FIG. 3, the responder 3 is a computer which is requested by the initiator 2 to establish SA. When requested to establish SA, the responder 3 establishes SA by using a Session Initiation Protocol (SIP) message.

The initiator 2 and the responder 3 may be personal computers (PC), fixed terminals such as telephone type terminals, or mobile terminals such as mobile telephones or Personal Digital Assistants (PDA).

Initiator and responder are just communication roles. So, the initiator 2 may operate as a responder depending on communication, and vice versa.

The NAT 4 is a communication device equipped with a Network Address Translation (NAT) function. For example, the NAT 4 is a broadband router, a fire wall, or the like. To be specific, the NAT 4 translates address information of a packet during transfer of the packet.

The SIP proxy 6 is installed in the communication path between the initiator 2 and the responder 3 to transfer SIP message.

The NAT 4, the SIP proxy 6, and the responder 3 are connected to the communication network 1 through the communication line 9. The initiator 2 is connected to the NAT 4 through the communication line 9. In other words, the initiator 2 is connected to the communication network 1 via the NAT 4.

Figure 2:
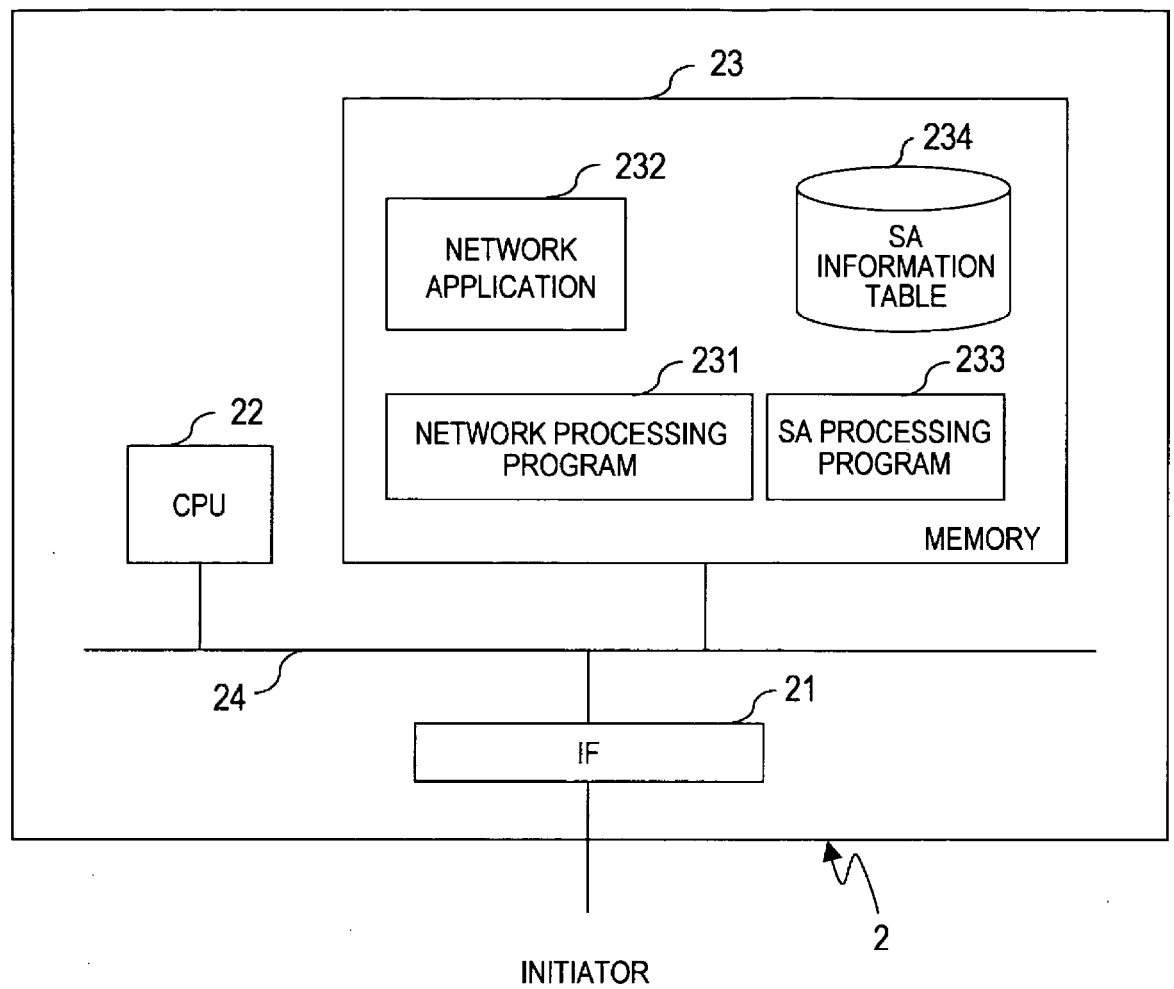
FIG. 2 is a block diagram of the initiator of the first embodiment.

FIG. 2 is a block diagram of the initiator 2 of the first embodiment.

The initiator 2 includes an interface (IF) 21, a CPU 22, and a memory 23. The IF 21, the CPU 22, and the memory 23 are interconnected through a data path 24.

The IF 21 is connected to an external device such as the NAT 4 via the communication line 9.

The CPU 22 executes programs stored in the memory 23 to carry out various processes. For example, the CPU 22 transmits/receives a packet via the IF 21.

The memory 23 stores a network processing program 231, a network application (network AP) 232, an SA processing program 233, and an SA information table 234.

The network processing program 231 transmits/receives data via the communication network 1. For example, the network processing program 231 is a Transmission Control Protocol/Internet Protocol (TCP/IP) stack.

The network AP 232 transmits/receives data with a network AP of the responder 3 by using the network processing program 231. This embodiment takes a web browser as an example of the network AP 232.

The SA processing program 233 establishes SA, and stores the SA information in the SA information table 234. The SA information is exchanged between the initiator 2 and the responder 3 during SA establishing process. Thus, the SA processing program 233 establishes security for encryption, authentication, or the like. The network processing program 231 loads the SA processing program 233 during packet transmission/reception.

The SA processing program 233 exchanges the SA information with the responder 3 to establish SA. Then, the SA processing program 233 updates the SA information table 234.

As described below referring to FIG. 4, the SA information table 234 stores the SA information. The SA information may be stored in one table such as the SA information table 234 or a plurality of tables in a divided manner as in the case of IPsec.

FIG. 2 shows a configuration alone necessary for an operation of the initiator 2. Accordingly, a computer that can operate as both an initiator and a responder has configuration of the responder 3 as shown in FIG. 3.

Figure 3:
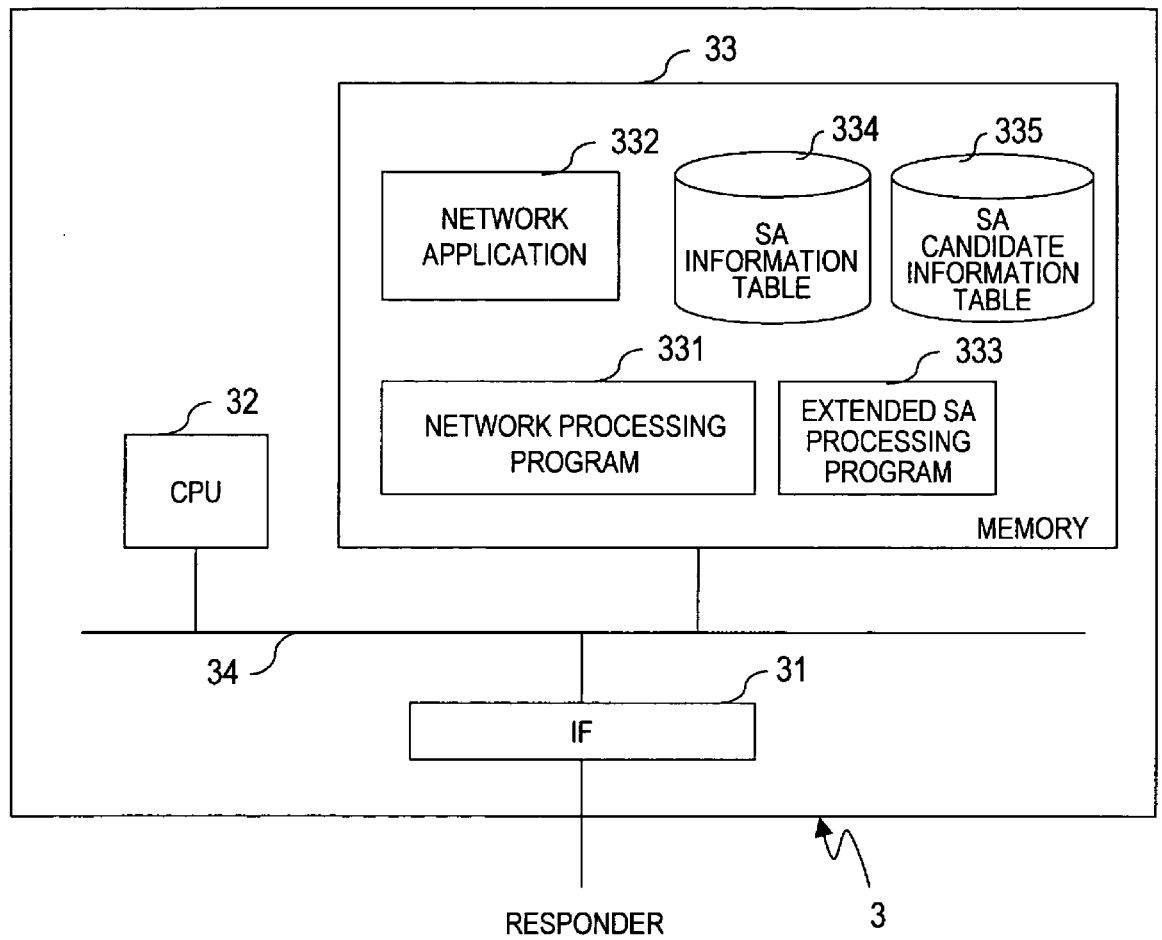
FIG. 3 is a block diagram of the responder of the first embodiment.

FIG. 3 is a block diagram of the responder 3 of the first embodiment.

The responder 3 includes an interface (IF) 31, a CPU 32, and a memory 33. The IF 31, the CPU 32, and the memory 33 are interconnected through a data path 34.

The IF 31 is connected to an external device via the communication line 9 and the communication network 1.

The CPU 32 executes programs stored in the memory 33 to carry out various processes. For example, the CPU 32 transmits/receives a packet via the IF 31.

The memory 33 stores a network processing program 331, a network application (network AP) 332, an extended SA processing program 333, an SA information table 334, and an SA candidate information table 335.

The network processing program 331 transmits/receives data via the communication network 1. For example, the network processing program 331 is a TCP/IP stack.

The network AP 332 transmits/receives data with the network AP 232 of the initiator 2 by using the network processing program 331. This embodiment takes a web server as an example of the network AP 332.

The extended SA processing program 333 establishes SA, and stores the SA information in the SA information table 334. Thus, the SA processing program 333 establishes security for encryption, authentication, or the like. The network processing program 331 loads the extended SA processing program 333 during packet transmission/reception.

The extended SA processing program 333 exchanges the SA information with the initiator 2 during SA establishing process. Then, the extended SA processing program 333 updates the SA information table 334.

The extended SA processing program 333 treats SA information having an undetermined part in address information as SA candidate information. The extended SA processing program 333 manages the SA candidate information by storing it in the SA candidate information table 335. Additionally, the extended SA processing program 333 creates new SA information based on the SA candidate information stored in the SA candidate information table 335.

As described below referring to FIG. 5, the SA information table 334 stores the SA information. The SA information may be stored in one table such as the SA information table 334 or a plurality of tables in a divided manner as in the case of IPsec.

As described below referring to FIG. 6, the SA candidate information table 335 stores the SA candidate information. The SA candidate information may be stored in one table such as the SA candidate information table 335 or in a plurality of tables in a divided manner.

FIG. 4 is a diagram showing a structure of the SA information table 234 of the initiator 2 of the first embodiment.

The SA information table 234 includes a direction 2341, a source IP address 2342, a source port 2343, a destination IP address 2344, a destination port 2345, a protocol 2346, an SPI 2347, key data 2348, and a lifetime 2349.

One record of the SA information table 234 stores one piece of SA information.

The direction 2341 indicates whether the SA is applied to packet reception or packet transmission. To be specific, "inbound" is stored in the direction 2341 if the SA is applied to the packets that the initiator 2 receives. On the other hand, "outbound" is stored in the direction 2341 if the SA is applied to the packets that the initiator 2 transmits.

The source IP address 2342 is an IP address of a transmission origin of a packet to which the SA corresponding to the SA information is applied. The source port 2343 is a port number of the transmission origin of the packet to which the SA corresponding to the SA information is applied.

The destination IP address 2344 is an IP address of a transmission destination of a packet to which the SA corresponding to the SA information is applied. The destination port 2345 is a port number of the transmission destination of the packet to which the SA corresponding to the SA information is applied.

The protocol 2346 is for the packet to which the SA corresponding to the SA information is applied. The SPI 2347 is an identifier which enables the initiator 2 and the responder 3 to uniquely identify the SA information.

The key data 2348 is information for encrypting/decrypting the packet to which the SA corresponding to the SA information is applied.

The lifetime 2349 indicates a period for applying the SA corresponding to the SA information to the packet. In other words, after passage of the lifetime 2349 from the creation of the SA information, the initiator 2 deletes the SA information from the SA information table 234.

FIG. 5 is a diagram showing a structure of the SA information table 334 of the responder 3 of the first embodiment.

The SA information table 334 includes a direction 3341, a source IP address 3342, a source port 3343, a destination IP address 3344, a destination port 3345, a protocol 3346, an SPI 3347, key data 3348, and a lifetime 3349.

One record of the SA information table 334 stores one piece of SA information.

The direction 3341 indicates whether the SA is applied to packet reception or packet transmission. To be specific, "inbound" is stored in the direction 3341 if the SA is applied to the packets that the responder 3 receives. On the other hand, "outbound" is stored in the direction 3341 if the SA is applied to the packets that the responder 3 transmits.

The source IP address 3342 is an IP address of a transmission origin of a packet to which the SA corresponding to the SA information is applied. The source port 3343 is a port number of the transmission origin of the packet to which the SA corresponding to the SA information is applied.

The destination IP address 3344 is an IP address of a transmission destination of a packet to which the SA corresponding to the SA information is applied. The destination port 3345 is a port number of the transmission destination of the packet to which the SA corresponding to the SA information is applied.

The protocol 3346 is for the packet to which the SA corresponding to the SA information is applied. The SPI 3347 is an identifier which enables the initiator 2 and the responder 3 to uniquely identify the SA information.

The key data 3348 is information for encrypting/decrypting the packet to which the SA corresponding to the SA information is applied.

The lifetime 3349 indicates a period for applying the SA corresponding to the SA information to the packet. In other words, after passage of the lifetime 3349 from the creation of the SA information, the responder 3 deletes the SA information from the SA information table 334.

FIG. 6 is a diagram showing a structure of the SA candidate information table 335 of the responder 3 of the first embodiment.

The SA candidate information table 335 includes a pair ID 3350, a direction 3351, a source IP address 3352, a source port 3353, a destination IP address 3354, a destination port 3355, a protocol 3356, an SPI 3357, key data 3358, a lifetime 3359 of the SA, and a lifetime 3360 of the SA candidate.

One record of the SA candidate information table 335 stores one piece of SA candidate information.

The pair ID 3350 is a unique identifier of a pair to which the SA candidate information belongs. SA candidate information regarding the SA applied to a packet which the responder 3 receives from the initiator 2, and SA candidate information regarding the SA applied to a packet which the responder 3 transmits to the initiator 2 are treated as one pair.

The direction 3351 indicates whether the SA corresponding to SA information created based on the SA candidate information is applied to packet reception or packet transmission. To be specific, "inbound" is stored in the direction 3351 if the SA is applied to the packets that the responder 3 receives. On the other hand, "outbound" is stored in the direction 3351 if the SA is applied to the packets that the responder 3 transmits.

The source IP address 3352 is an IP address of a transmission origin of a packet to which the SA corresponding to the SA information created based on the SA candidate information is applied. The source port 3353 is a port number of the transmission origin of the packet to which the SA corresponding to the SA information created based on the SA candidate information is applied.

The destination IP address 3354 is an IP address of a transmission destination of a packet to which the SA corresponding to the SA information created based on the SA candidate information is applied. The destination port 3355 is a port number of the transmission destination of the packet to which the SA corresponding to the SA information created based on the SA candidate information is applied.

The SA candidate information is SA information having an undetermined part in address information. Accordingly, in the SA candidate information table 335, one of the source IP address 3352 and the destination IP address 3354 is undetermined. In a similar manner, one of the source port 3353 and the destination port 3355 is undetermined.

The protocol 3356 is for the packet to which the SA corresponding to the SA information created based on the SA candidate information is applied. The SPI 3357 is a unique identifier of the SA information created based on the SA candidate information.

The key data 3358 is information for encrypting/decrypting the packet to which the SA corresponding to the SA information created based on the SA candidate information is applied.

The lifetime 3359 of the SA indicates a period for applying the SA created based on the SA candidate information to the packet. In other words, after passage of the lifetime 3359 from the creation of the SA candidate information, the responder 3 deletes the SA information created based on the SA candidate information.

The lifetime 3360 of the SA candidate indicates a period during which the responder 3 can create SA information from the SA candidate information. In other words, after passage of the lifetime 3360 from the creation of the SA candidate information, the responder 3 deletes the SA candidate information from the SA candidate information table 335. Thus, the responder 3 can delete unnecessary SA candidate information from the SA candidate information table 335.

Figure 7:
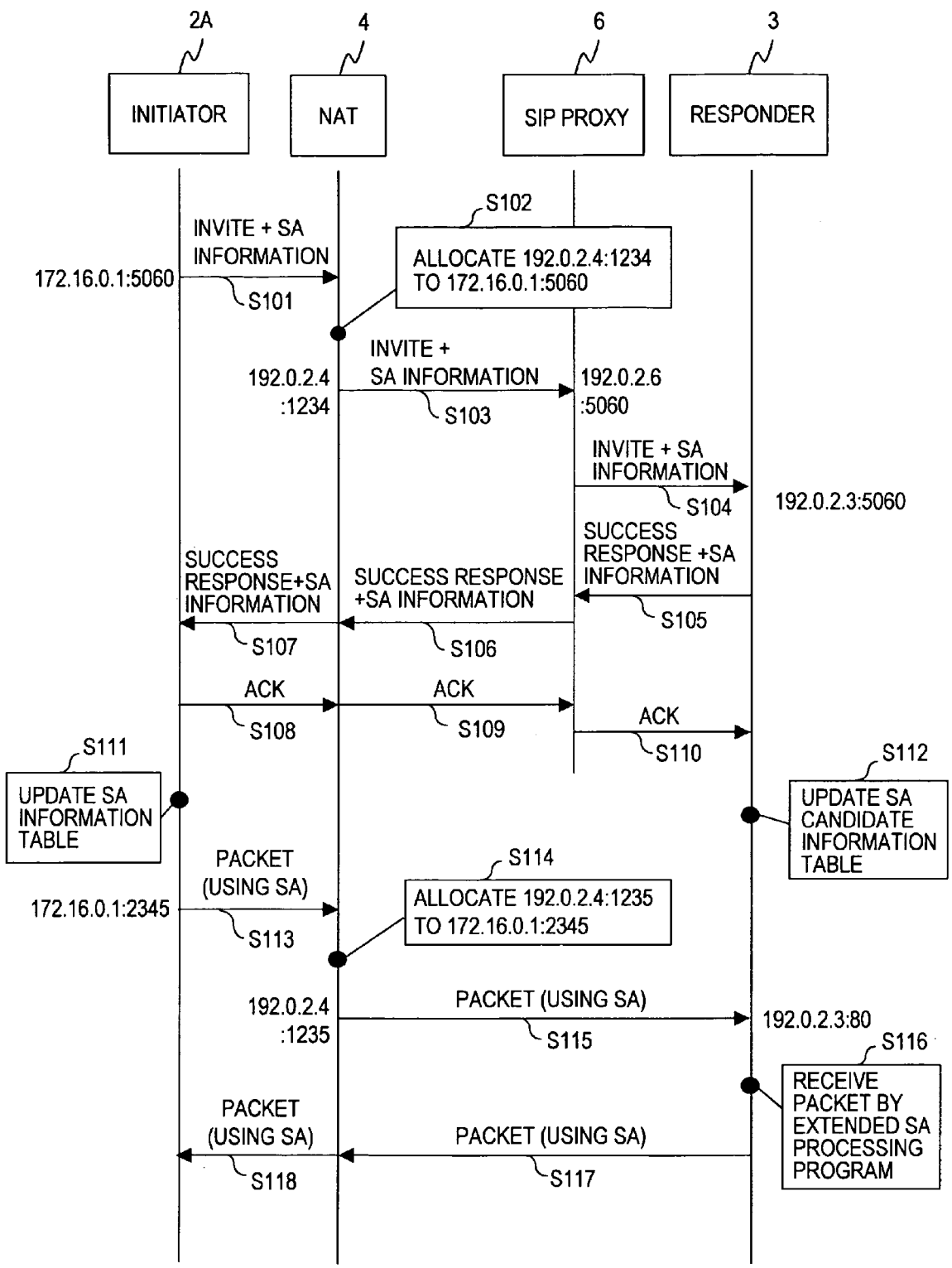
FIG. 7 is a sequence diagram showing an SA establishing process of the computer system of the first embodiment.

FIG. 7 is a sequence diagram showing an SA establishing process of the computer system of the first embodiment.

The computer system of the sequence diagram encrypts communication between the web browser operated in the initiator 2A and the web server operated in the responder 3. In this embodiment, the computer system establishes SA between the initiator 2A and the responder 3 for the encryption.

In this case, an IP address of the initiator 2A is "172.16.0.1". An IP address of the communication network 1 side of the NAT 4 is "192.0.2.4". An IP address of the responder 3 is "192.0.2.3". An IP address of the SIP proxy 6 is "192.0.2.6".

With a certain opportunity, the initiator 2A judges a need to establish SA between the initiator 2A and the responder 3.

In this case, the network processing program 231 of the initiator 2A receives a packet transmission request from the network AP 232 of the initiator 2A. Then, the network processing program 231 requests the SA processing program 233 of the initiator 2A to establish SA. After the SA processing program 233 has received the SA establishing request, the initiator 2A judges a need to establish SA between port 2345 of the initiator 2A and port 80 of the responder 3.

Subsequently, the SA processing program 233 of the initiator 2A transmits a packet containing an INVITE message from port 5060 of the initiator 2A to the SIP proxy 6 (S101). Port 5060 is default port of SIP.

SA information for a proposal is stored in a body of the INVITE message. The proposal SA information contains an address "172.16.0.1:2345" for which communication cannot be started from the responder 3 side. In the address "172.16.0.1:2345", "172.16.0.1" before the colon of the address is an IP address, and "2345" after the colon of the address is a port number.

SA information of an extensible markup language (XML) form stored in the body of the SIP message will be described. The SA information may be stored in the SIP message by another form.

FIG. 8 is an explanatory diagram of the SA information of the first embodiment.

The SA information contains policy information 901, initiator address information 902, responder address information 903, and key generation information 904. The policy information 901 contains SPI and a lifetime of the SA information. The initiator address information 902 contains an IP address, port number, and protocol of the initiator 2A which establish SA corresponding to the SA information. The responder address information 903 contains an IP address, port number, and protocol of the responder 3 which establish SA corresponding to the SA information. The key generation information 904 contains information for generating key data of the SA information.

Now, description will be made returning to FIG. 7.

The NAT 4 receives a packet containing an INVITE message from the initiator 2A. Then, the NAT 4 allocates an address of the NAT 4 to a source address of the received packet (S102). In this case, the NAT 4 allocates an address "192.0.2.4:1234" of the NAT 4 to the source address "172.16.0.1:5060" of the packet.

Next, the NAT 4 translates the source address of the received packet into the allocated address. The NAT 4 transmits the address-translated packet to the SIP proxy 6 (S103). Thereafter, for communication between the initiator 2A and the SIP proxy 6, the address allocated by the NAT 4 is used as the address of the initiator 2A.

The SIP proxy 6 receives the packet containing the INVITE message from the NAT 4. Then, the SIP proxy 6 transfers the received packet to the responder 3 (S104).

The responder 3 receives the packet containing the INVITE message from the SIP proxy 6. Then, the responder 3 processes the received packet by using the network processing program 331.

The network processing program 331 judges that the received packet contains SA information, and loads the extended SA processing program 333.

The extended SA processing program 333 inspects proposal SA information contained in the received packet. Then, the extended SA processing program 333 creates SA information for response based on the inspected proposal SA information. The SA information for response is SA information permitted to be used by the extended SA processing program 333.

For example, upon reception of plural pieces of proposal SA information, the extended SA processing program 333 selects SA information permitted to be used from the received pieces of proposal SA information. Then, the extended SA processing program 333 sets the selected SA information as SA information for response.

The extended SA processing program 333 stores the created response SA information in a success response message. For example, the success response message is a 200 OK message. The extended SA processing program 333 creates a packet containing the success response message.

Next, the network processing program 331 of the responder 3 transmits the packet created by the extended SA processing program 333 to the SIP proxy 6 (S105).

The SIP proxy 6 receives the packet containing the success response message from the network processing program 331 of the responder 3. Then, the SIP proxy 6 transfers the received packet containing the success response message to the source address of the packet containing the INVITE message received in the step S103. In other words, the SIP proxy 6 transfers the received packet containing the success response message to the NAT 4 (S106).

The NAT 4 receives the packet containing the success response message from the SIP proxy 6. Then, the NAT 4 transfers the received packet to the initiator 2A (S107).

Next, the initiator 2A receives the packet containing the success response message from the NAT 4. As described above, the initiator 2A and the responder 3 exchange the SA information.

The initiator 2A transmits a packet containing an ACK message to the SIP proxy 6 via the NAT 4 (S108, and S109).

The initiator 2A updates the SA information table 234 based on the packet received in the step S107.

To be specific, the initiator 2A extracts the SA information from the packet received in the step S107. The initiator 2A adds new records equal to the number of SA designated by the extracted SA information to the SA information table 234. The initiator 2A stores "inbound" in the direction 2341 of a record regarding SA applied when the packet is received. On the other hand, the initiator 2A stores "outbound" in the direction 2341 of a record regarding SA applied when the packet is transmitted.

The initiator 2A extracts an IP address, port number, and protocol from initiator address information 902 of the extracted SA information. When "outbound" is stored in the direction 2341, the initiator 2A stores the extracted IP address in a source IP address 2342 of a new record. On the other hand, when "inbound" is stored in the direction 2341, the initiator 2A stores the extracted IP address in a destination IP address 2344 of the new record.

When "outbound" is stored in the direction 2341, the initiator 2A stores the extracted port number in a source port 2343 of the new record. On the other hand, when "inbound" is stored in the direction 2341, the initiator 2A stores the extracted port number in a destination port 2345 of the new record. Then, the extracted protocol is stored in protocol 2346 of the new record.

The initiator 2A extracts an IP address and a port number from responder address information 903 of the extracted SA information. When "outbound" is stored in the direction 2341, the initiator 2A stores the extracted IP address in a destination IP address 2344 of the new record. On the other hand, when "inbound" is stored in the direction 2341, the initiator 2A stores the extracted IP address in a source IP address 2342 of the new record.

When "outbound" is stored in the direction 2341, the initiator 2A stores the extracted port number in a destination address 2345 of the new record. On the other hand, when "inbound" is stored in the direction 2341, the initiator 2A stores the extracted port number in a source port 2343 of the new record.

Next, the initiator 2A extracts SPI and a lifetime from policy information 901 of the extracted SA information. The extracted SPI is stores in an SPI 2347 of the new record. The extracted lifetime is stored in a lifetime 2348 of the new record.

The initiator 2A generates key data based on key generation information 904 of the extracted SA information. Then, the initiator 2A stores the generated key data in key data 2348 of the new record.

As described above, the initiator 2A updates the SA information table 234 (S111). The initiator 2A may update the SA information table 234 when necessary pieces of information have been prepared.

The SIP proxy 6 receives the packet containing the ACK message from the initiator 2A. Then, the SIP proxy 6 transfers the received packet to the responder 3 (S110).

The responder 3 receives the packet containing the ACK message from the SIP proxy 6. Then, the responder 3 judges possibility of direct communication with an address notified from the initiator 2A.

To be specific, the responder 3 extracts the initiator address information 902 from the SA information contained in the packet received in the step S104. Then, the responder 3 judges possibility of direct communication with the address "172.16.0.1:2345" contained in the extracted address information 902.

For example, the responder 3 judges presence of the NAT 4 in the communication path between the responder 3 and the initiator 2A by using one of three methods shown below. If the NAT 4 is present, the responder 3 judges that direct communication with the address notified from the initiator 2A is inhibited. On the other hand, if the NAT 4 is not present, the responder 3 judges that direct communication with the address notified from the initiator 2A is permitted.

(1) A method in which the responder 3 detects presence of the NAT 4 during exchanging of SA information.
(2) A method in which the SIP proxy 6 detects presence of the NAT 4 during exchanging of SA information, and then, the SIP proxy 6 notifies the presence of the NAT 4 to the responder 3.
(3) A method in which the initiator 2 notifies presence of the NAT 4 to the responder 3 during exchanging of SA information.

First, a specific example of the method (1) will be described. For example, the responder 3 judges whether an IP address notified from the initiator 2A is a private IP address. Upon determination that the IP address notified from the initiator 2A is a private IP address, the responder 3 judges presence of the NAT 4 in the communication path. Accordingly, in the case of the method (1), the initiator 2 or the SIP proxy does not need to execute any special processing.

A specific example of the method (2) will be described. For example, the SIP proxy 6 detects presence of the NAT 4 by comparing the address information of the packet received in the step S103 with the initiator address information 902 of the SA information stored in the packet. Upon detection of the presence of the NAT 4, the SIP proxy 6 inserts a character string indicating the presence of the NAT 4 into a head or a body of the packet transferred to the responder 3 in the step S104. Then, upon detection of the character string indicating the presence of the NAT 4 from the packet received in the step S104, the responder 3 judges the presence of the NAT 4 in the communication path.

Next, a specific example of the method (3) will be described. For example, the initiator 2 has been notified of the presence of the NAT 4 beforehand. The initiator 2 may detect the presence of the NAT 4 beforehand by using a STUN server or the like. Upon confirmation of the presence of the NAT 4, the initiator 2 inserts a character string indicating the presence of the NAT 4 into the header or the body of the packet transmitted in the step S101. Then, upon detection of the character string indicating the presence of the NAT 4 from the packet received in the step S104, the responder 3 judges the presence of the NAT 4 in the communication path.

Upon judgment that direct communication with the address notified from the initiator 2A is permitted, the responder 3 updates the SA information table 334 shown in FIG. 5. To be specific, the responder 3 updates the SA information table 334 based on the packet transmitted in the step S105. The updating process of the SA information table 334 by the responder 3 is similar to the updating process (S111) of the SA information table of the initiator 2, and thus description thereof will be omitted.

On the other hand, upon judgment that direct communication with the address notified from the initiator 2A is inhibited, the responder 3 updates the SA candidate information table 335 shown in FIG. 6.

First, the responder 3 updates the SA candidate information table 335 based on the packet transmitted in the step S105.

To be specific, the responder 3 extracts SA information from the packet transmitted in the step S105. The responder 3 adds new records equal in number to SA's designated by the extracted SA information to the SA candidate information table 335.

The responder 3 stores a value common among all the newly added records in a pair ID 3350 of the new records. At this time, the responder 3 selects a value not overlapped with a pair ID 3350 of existing records to store it in the pair ID 3350 of the new records.

The responder 3 stores "inbound" in a direction 3351 of a record regarding SA applied when it receives a packet. On the other hand, the render 3 stores "outbound" in a direction 3351 of a record regarding SA applied when it transmits a packet.

Upon storage of "inbound" in the direction 3351, the responder 3 stores "undetermined" in a source IP address 3352 and a source port 3353 of the new record. On the other hand, upon storage of "outbound" in the direction 3351, the responder 3 stores "undetermined" in a destination IP address 3354 and a destination port 3355 of the new record.

Next, the responder 3 extracts an IP address and a port number from responder address information 903 of the extracted SA information.

Upon storage of "inbound" in the direction 3351, the responder 3 stores the extracted IP address in the destination IP address 3354 of the new record. On the other hand, upon storage of "outbound" in the direction 3351, the responder 3 stores the extracted IP address in the source IP address 3352 of the new record.

Upon storage of "inbound" in the direction 3351, the responder 3 stores the extracted port number in the destination port 3355 of the new record. On the other hand, upon storage of "outbound" in the direction 3351, the responder 3 stores the extracted port number in the source port 3353 of the new record.

Next, the responder 3 extracts SPI and a lifetime from policy information 901 of the extracted SA information. The extracted SPI is stored in SPI 3357 of the new record. The extracted lifetime is stored in a lifetime 3359 of SA of the new record.

The responder 3 generates key data based on key generation information 904 of the extracted SA information. For example, the responder 3 generates key data by Diffie-Hellman key exchange. Then, the responder 3 stores the generated key data in key data 3358 of the new record.

The responder 3 stores a preset value in a lifetime 3360 of an SA candidate of the new record.

As described above, the responder 3 updates the SA candidate information table 335 (S112).

It is presumed that the network AP 232 of the initiator 2A requests transmission of a packet to the network program 231 of the initiator 2A after S112. The source port of the packet is port 2345 of the initiator 2A, and the destination port of the packet is port 80 of the responder 3. In this case, the packet may be a packet which has given the opportunity of establishing SA and has been buffered.

The network processing program 231 of the initiator 2A is requested to transmit a packet by the network AP 232. Then, the network processing program 231 loads the SA processing program 233 of the initiator 2A to provide a security function to the packet to be transmitted.

The SA processing program 233 extracts a source IP address, a source port, a destination IP address, and a destination port from the transmitted packet. Then, The SA processing program 233 selects records whose source IP address 2342 is equal to the extracted source IP address and whose source port 2343 is equal to the extracted source port from the SA information table 234.

A record whose destination IP address 2344 is equal to the extracted destination IP address and whose destination port 2345 is equal to the extracted destination port is selected from the above selected records.

If there is any selected record, the SA processing program 233 encrypts the transmitted packet based on key data 2348 of the selected record. The encryption process of the SA processing program 233 is similar to that of conventional IPsec or the like.

The network processing program 231 transmits the packet encrypted by the SA processing program 233 to the responder 3 (S113).

The NAT 4 receives the packet from the initiator 2A. Then, the NAT 4 allocates an address of the NAT 4 to a source IP address of the received packet (S114). In this case, the NAT 4 allocates the address "192.0.2.4:1235" of the NAT 4 to the source IP address "172.16.0.1:2345" of the received packet.

The NAT 4 translates the source IP address of the received packet into the allocated address. The NAT 4 transmits the address-translated packet to the responder 3 (S115).

Thereafter, in communication between the initiator 2A and the responder 3, the address allocated by the NAT 4 is used as an address of the initiator 2A.

The responder 3 receives the packet from the NAT 4. Then, the responder 3 processes the received packet by the network processing program 331.

The network processing program 331 judges that the received packet has been encrypted to load the extended SA processing program 333.

The extended SA processing program 333 processes the received packet. The received packet processing of the extended SA processing program 333 will be described below in detail referring to FIG. 9.

It is then presumed that the network AP 332 of the responder 3 has requested transmission of a packet to the network processing program 331 of the responder 3. A source port of the packet is port 80 of the responder 3, and a destination port of the packet is port 1235 of the NAT 4.

The network processing program 331 of the responder 3 receives the packet transmission request from the network AP 332. Then, the network processing program 331 loads the extended SA processing program 333 of the responder 3 to provide a security function to the transmitted packet.

The extended SA processing program 333 encrypts the transmitted packet. The transmitted packet processing of the extended SA processing program 333 will be described below in detail referring to FIG. 10.

The network processing program 331 of the responder 3 transmits the packet encrypted by the extended SA processing program 333 to the NAT 4 (S117).

The NAT 4 receives a packet from the responder 3. Then, the NAT 4 transfers the received packet to the initiator 2A (S118).

The initiator 2A receives the packet from the NAT 4. Then, the initiator 2A processes the received packet by the network processing program 231. The network processing program 231 judges that the received packet has been encrypted to load the SA processing program 233.

The SA processing program 233 refers to the SA information table 234 to decrypt the received packet. The decryption process of the SA processing program 233 is similar to that in conventional IPsec or the like.

Figure 9:
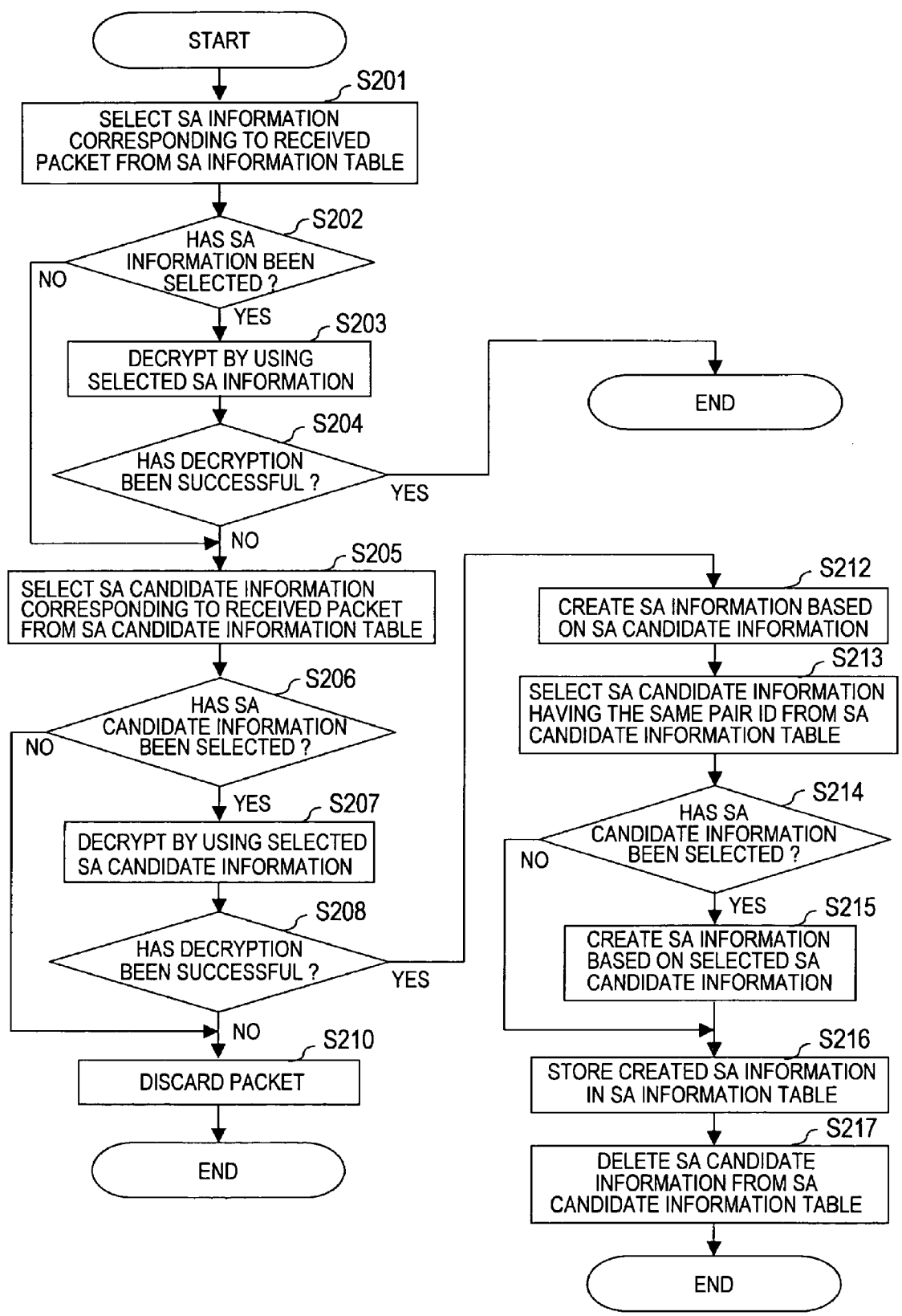
FIG. 9 is a flowchart showing the received packet processing of the extended SA processing program according to the first embodiment.

FIG. 9 is a flowchart showing the received packet processing of the extended SA processing program 333 according to the first embodiment.

The extended SA processing program 333 selects SA information corresponding to the received packet from the SA information table 334 based on information of the received packet (S201).

If SPI is not contained in the received packet, the extended SA processing program 333 selects records from the SA information table 334 based on address information of the received packet.

To be specific, the extended SA processing program 333 extracts a source IP address, a source port, a destination IP address, and a destination port from the received packet. Then, The extended SA processing program 333 selects records whose source IP address 3342 is equal to the extracted source IP address and whose source port 3343 is equal to the extracted source port from the SA information table 334.

The extended SA processing program 333 selects records whose destination IP address 3344 is equal to the extracted destination IP address and whose destination port 3345 is equal to the extracted destination port from the above selected records. Then, the selected record is set as SA information corresponding to the received packet.

On the other hand, if SPI is contained in the received packet, the extended SA processing program 333 selects records from the SA information table 334 based on the SPI of the received packet.

To be specific, the extended SA processing program 333 selects a record in which the SPI contained in the received packet coincides with the SPI 3347 of the SA information table 334 from the SA information table 334. Then, the selected record is set as SA information corresponding to the received packet.

Next, the extended SA processing program 333 judges whether any SA information corresponding to the received packet has been selected from the SA information table 334 (S202).

If no SA information corresponding to the received packet has been selected, the extended SA processing program 333 directly proceeds to step S205.

On the other hand, if any SA information corresponding to the received packet has been selected, the extended SA processing program 333 extracts key data 3348 from the record corresponding to the selected SA information. Then, the received packet is decrypted by using the extracted key data 3348 (S203).

The extended SA processing program 333 judges whether the decryption of the received packet has been successful (S204). To be specific, the extended SA processing program 333 judges whether the decryption of the received packet has been successful by using a checksum or a hash value with a key contained in the security header of the received packet.

Upon judgment that the decryption of the received packet has been successful, the extended SA processing program 333 sends the decrypted received packet to the network processing program 331. Then, the process is finished.

On the other hand, upon failure of the decryption of the received packet, the extended SA processing program 333 proceeds to the step S205.

In the conventional IPsec or the like, the responder 3 discards the packet when it judges that no SA information has been selected in the step S202 or the decryption of the received packet fails in the step S204.

However, the extended SA processing program 333 selects SA candidate information corresponding to the received packet from the SA candidate information table 335 based on the information of the received packet (S205).

If the SPI is not contained in the received packet, the extended SA processing program 333 selects a record from the SA candidate information table 335 based on the address information of the received packet.

To be specific, the extended SA processing program 333 extracts the source IP address, the source port, the destination IP address, and the destination port from the received packet. Then, the extended SA processing program 333 selects records whose source IP address 3352 is equal to the extracted source IP address and whose source port 3353 is equal to the extracted source port from the SA candidate information table 335.

The extended SA processing program 333 selects records whose destination IP address 3354 is equal to the extracted destination IP address and whose destination port 3355 is equal to the extracted destination port from the above selected records. Then, the selected record is set as SA candidate information corresponding to the received packet.

In this case, the extended SA processing program 333 treats the source IP address 3352, the source port 3353, the destination IP address 3354, or the destination port 3355 each storing "undetermined" as "any (satisfying all conditions)".

On the other hand, if the SPI is contained in the received packet, the extended SA processing program 333 selects a record from the SA candidate information table 335 based on the SPI of the received packet.

To be specific, the extended SA processing program 333 selects a record in which the SPI contained in the received packet coincides with the SPI 3357 of the SA candidate information table 335 is selected from the SA candidate information table 335. Then, the selected record is set as SA candidate information corresponding to the received packet.

Next, the extended SA processing program 333 judges whether any SA candidate information corresponding to the received packet has been selected from the SA candidate information table 335 (S206).

If no SA candidate information corresponding to the received packet has been selected, the extended SA processing program 333 cannot decrypt the received packet. Accordingly, the extended SA processing program 333 discards the packet (S210). Then, the process is finished.

On the other hand, if any SA candidate information corresponding to the received packet has been selected, the extended SA processing program 333 extracts key data 3358 from the selected SA candidate information. Then, the received packet is decrypted by using the extracted key data 3358 (S207).

The extended SA processing program 333 judges whether the decryption of the received packet has been successful (S208).

If the decryption of the received packet has failed, the extended SA processing program 333 cannot decrypt the received packet. Accordingly, the extended SA processing program 333 discards the packet (S210). Then, the process is finished.

On the other hand, if the decryption of the received packet has succeeded, the extended SA processing program 333 selects a record corresponding to the SA candidate information that successfully decrypts the received packet from the SA candidate information table 335. SA information is created based on the source IP address "192.0.2.4:1235" of the received packet and the record selected from the SA candidate information table 335 (S212). To be specific, the source IP address "192.0.2.4" of the received packet is stored in a source IP address of new SA information. The source port "1235" of the received packet is stored in a source port of the new SA information.

The extended SA processing program 333 extracts a pair ID 3350 from the record selected from the SA candidate information table 335. A record in which the extracted pair ID 3350 coincides with the pair ID 3350 of the SA candidate table 335 is selected from the SA candidate information table 335 (S213).

The extended SA processing program 333 judges whether any record of the coincident pair ID 3350 has been selected from the SA candidate information table 335 (S214).

If no record of the coincident pair ID 3350 has been selected, the extended SA processing program 333 judges that simultaneously created SA information is not present to directly proceed to step S216.

On the other hand, if any record of the coincident pair ID 3350 has been selected, the extended SA processing program 333 creates SA information based on the selected record and the source IP address "192.0.2.4:1235" of the received packet (S215). To be specific, the source IP address "192.0.2.4" of the received packet is stored in destination IP address of new SA information. Then, the source port "1235" of the received packet is stored in the destination port of the new SA information.

Thus, the extended SA processing program 333 creates transmission (outbound) SA information corresponding to the reception (inbound) SA information created in the step S212.

Next, the extended SA processing program 333 stores the pieces of SA information created in the steps S212 and S215 in the SA information table 335 (S216).

Thus, the extended SA processing program 333 stores the pieces of reception and transmission SA information in the SA information table 335. For example, the extended SA processing program 333 creates the SA information table 334 shown in FIG. 5 based on the SA candidate information table 335 shown in FIG. 6. The extended SA processing program 333 does not create transmission SA information if no record of the coincident pair ID 3350 is selected in the step S214.

The extended SA processing program 333 deletes the records selected in the steps S205 and S213 from the SA candidate information table 335 (S217).

Next, the extended SA processing program 333 sends the decrypted received packet to the network processing program 331. Then, the process is finished.

Figure 10:
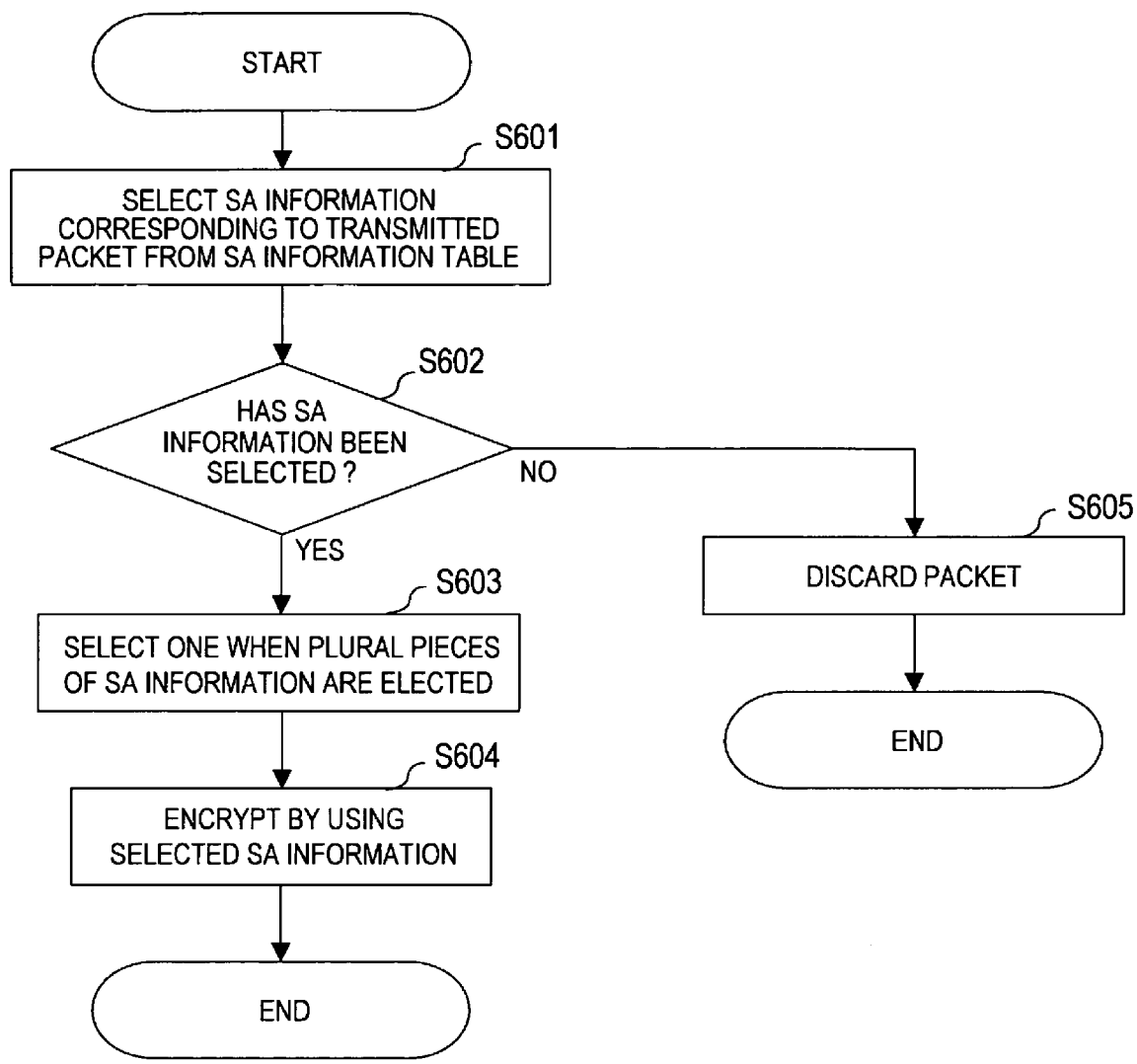
FIG. 10 is a flowchart showing the transmitted packet processing of the extended SA processing program according to the first embodiment.

FIG. 10 is a flowchart showing the transmitted packet processing of the extended SA processing program according to the first embodiment.

The extended SA processing program 333 selects SA information corresponding to the transmitted packet from the SA information table 334 based on address information of the transmitted packet (S601).

To be specific, the extended SA processing program 333 extracts a source IP address, a source port, a destination IP address, and a destination port from the transmitted packet. Then, the extended SA processing program 333 selects records whose source IP address 3342 is equal to the extracted source IP address and whose source port 3343 is equal to the extracted source port from the SA information table 334.

The extended SA processing program 333 selects records whose destination IP address 3344 is equal to the extracted destination IP address and whose destination port 3345 is equal to the extracted destination port from the above selected records. Then, the selected record is set as SA information corresponding to the transmitted packet.

Next, the extended SA processing program 333 judges whether any SA information corresponding to the transmitted packet has been selected from the SA information table 334 (S602).

If no SA information corresponding to the transmitted packet has been selected, the extended SA processing program 333 cannot encrypt the transmitted packet. Accordingly, the extended SA processing program 333 discards the transmitted packet (S605). Then, the process is finished.

On the other hand, if any SA information corresponding to the received packet has been selected, the extended SA processing program 333 can encrypt the transmitted packet.

When plural pieces of SA information are selected in the step S601, the extended SA processing program 333 selects one from the selected plural pieces of SA information (S603). For example, the extended SA processing program 333 selects one of strictest application conditions of a security policy from the selected plural pieces of SA information.

Next, the extended SA processing program 333 extracts key data 3348 from the record corresponding to the selected SA information. Then, the transmitted packet is decrypted by using the extracted key data 3348 (S604).

The extended SA processing program 333 sends the encrypted transmitted packet to the network processing program 331. Then, the process is finished.

As described above, the transmitted packet processing of the extended SA processing program 333 is similar to that of the conventional IPsec or the like, and no SA candidate information is used.

According to the embodiment, the responder 3 temporarily stores the SA candidate information which is SA information of undetermined address information. The responder 3 creates the SA information based on the SA candidate information. Thus, the initiator 2 and the responder 3 can establish SA for communication carried out via the NAT 4 without reserving the address of the NAT 4 beforehand. Hence, the network AP 232 of the initiator 2 and the NAT 4 do not need to execute any special processing.

Second Embodiment

According to a second embodiment, a responder 3 manages SA information and SA candidate information altogether in one table.

A configuration of a computer system of the second embodiment is similar to that of the computer system of the first embodiment shown in FIG. 1 except for a configuration of the responder 3. A process of the computer system of the second embodiment is similar to that of the first embodiment shown in FIG. 7 except for received packet processing of the responder 3. Thus, description of similar components and similar processing will be omitted.

Figure 11:
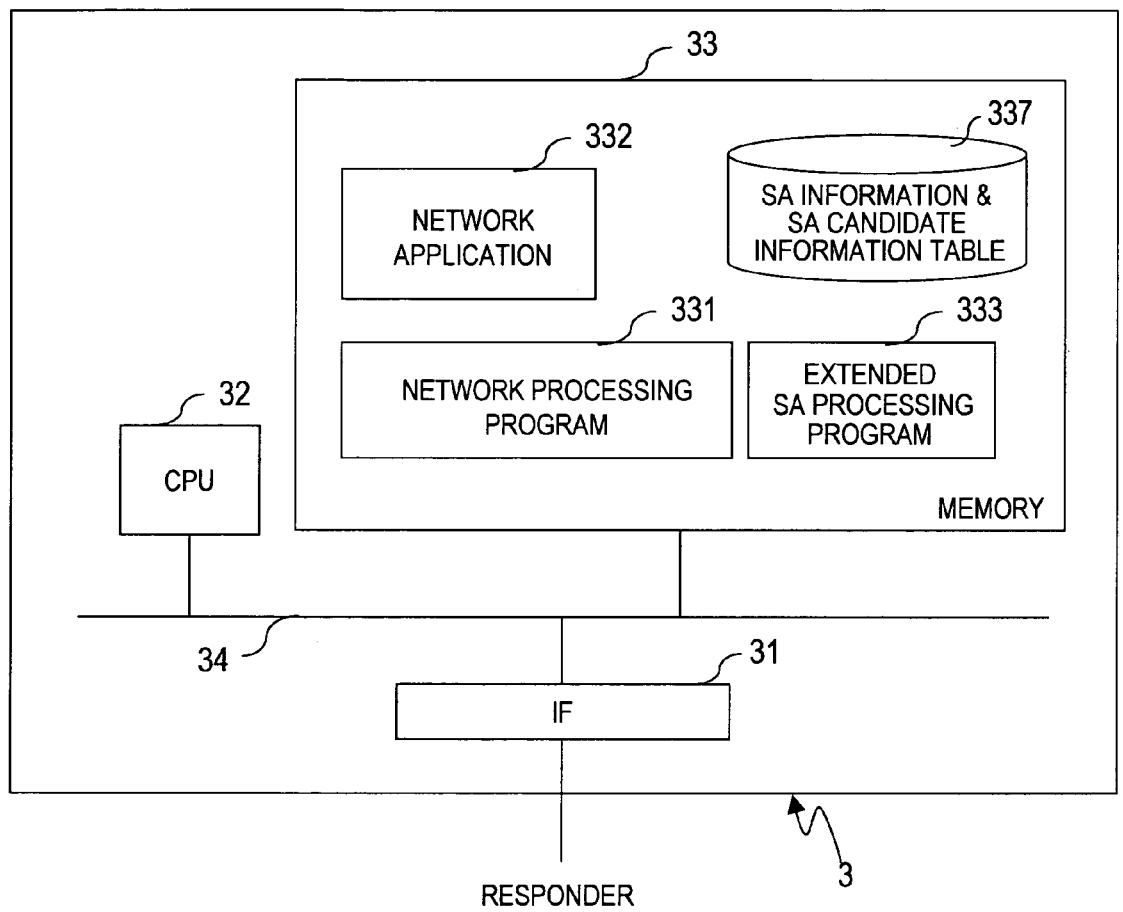
FIG. 11 is a block diagram of the responder of the second embodiment.

FIG. 11 is a block diagram of the responder 3 of the second embodiment.

The responder 3 of the second embodiment stores an SA information & SA candidate information table 337 in a memory 33 in place of the SA information table 334 and the SA candidate information table 335. Other components of the responder 3 of the second embodiment are similar to those of the responder 3 of the first embodiment shown in FIG. 3. Similar components are denoted by similar reference numerals, and description thereof will be omitted.

As described below referring to FIG. 12, the SA information & SA candidate information table 337 stores SA information and SA candidate information together.

FIG. 12 is a diagram showing a structure of the SA information & SA candidate information 337 of the responder 3 of the second embodiment.

The SA information & SA candidate information table 337 includes a pair ID 3370, a status 3371, a direction 3372, a source IP address 3373, a source port 3374, a destination IP address 3375, a destination port 3376, a protocol 3377, an SPI 3378, key data 3379, a lifetime 3380 of SA, and a lifetime 3381 of an SA candidate.

One record of the SA information & SA candidate information table 337 stores one of SA information and SA candidate information.

The pair ID 3370 is a unique identifier of a pair to which the SA information or the SA candidate information belongs.

The status 3371 indicates whether the record stores an SA information or an SA candidate information. In other words, if the record stores an SA information, "completed" is stored in the status 3371. If the record stores an SA candidate information, "candidate" is stored in the status 3371.

The direction 3372 indicates whether the SA related to the record is applied to packet reception or packet transmission.

The source IP address 3373 is an IP address of a transmission origin of a packet to which the SA related to the record is applied. The source port 3374 is a port number of the transmission origin of the packet to which the SA related to the record is applied.

The destination IP address 3375 is an IP address of a transmission destination of a packet to which the SA related to the record is applied. The destination port 3376 is a port number of the transmission destination of the packet to which the SA related to the record is applied.

The protocol 3377 is for the packet to which the SA related to the record is applied. The SPI 3378 is a unique identifier of the SA related to the record.

The key data 3379 is information for encrypting/decrypting the packet to which the SA related to the record is applied.

The lifetime 3380 of the SA indicates a period for applying the SA related to the record to the packet.

The lifetime 3381 of the SA candidate indicates a period during which the responder 3 can create SA information from the SA candidate information. Accordingly, if the record stores the SA information, no value is stored in the lifetime 3381 of the SA candidate.

Figure 13:
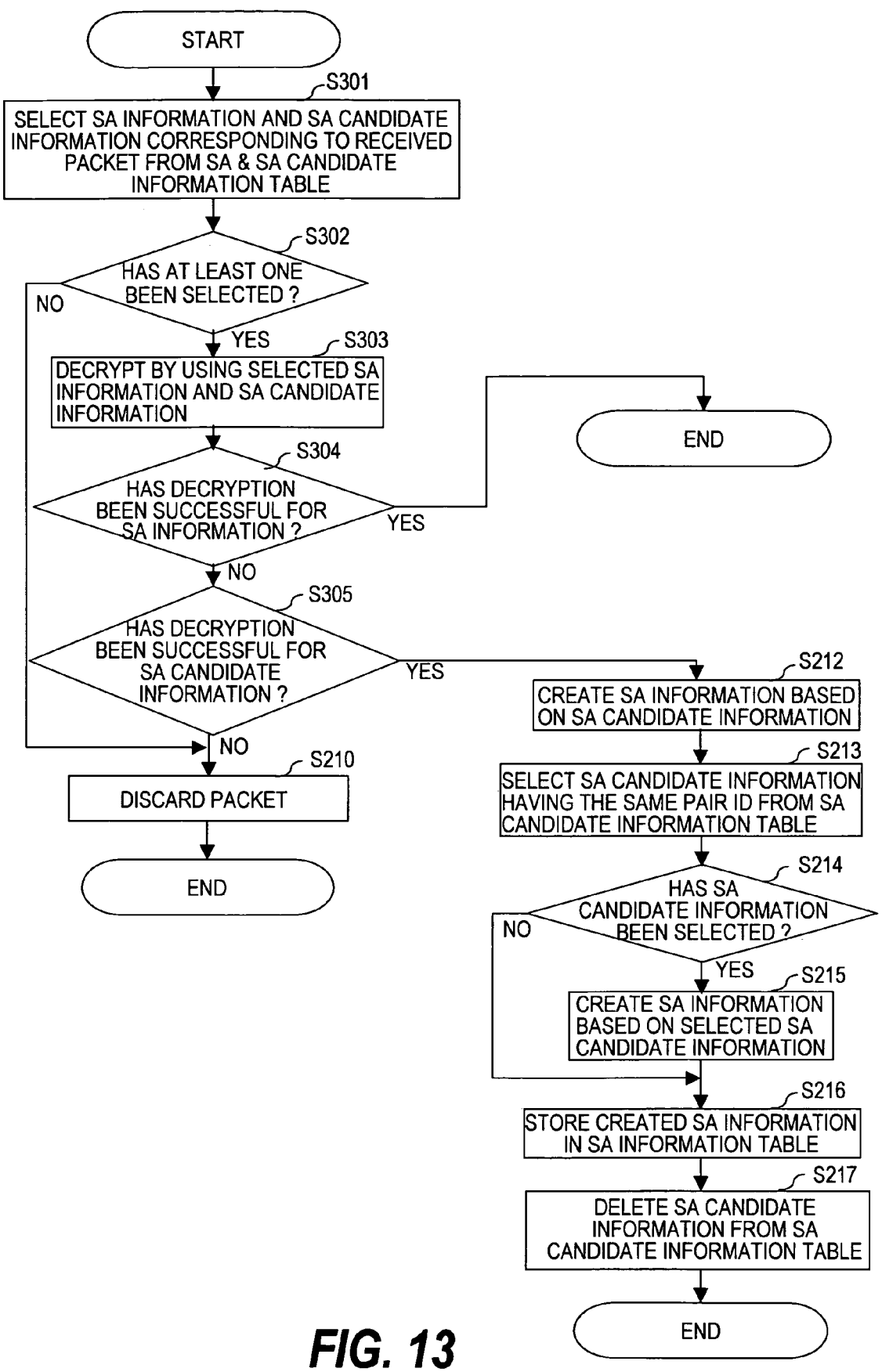
FIG. 13 is a flowchart showing the received packet processing of an extended SA processing program according to the second embodiment.

FIG. 13 is a flowchart showing the received packet processing of an extended SA processing program 333 according to the second embodiment.

The extended SA processing program 333 selects SA information and SA candidate information corresponding to the received packet from the SA information & SA candidate information table 337 based on address information of the received packet (S301).

If SPI is not contained in the received packet, the extended SA processing program 333 selects records from the SA information & SA candidate information table 337 based on the address information of the received packet.

To be specific, the extended SA processing program 333 extracts a source IP address, a source port, a destination IP address, and a destination port from the received packet. Then, the extended SA processing program 333 selects records whose source IP address 3373 is equal to the extracted source IP address and whose source port 3374 is equal to the extracted source port from the SA information & SA candidate information table 337.

The extended SA processing program 333 selects records whose destination IP address is equal to the extracted destination IP address and whose destination port is equal to the extracted destination port from the above selected records. Then, the selected record is set as SA information or SA candidate information corresponding to the received packet.

On the other hand, if SPI is contained in the received packet, the extended SA processing program 333 selects a record from the SA information & SA candidate information table 337 based on the SPI of the received packet.

To be specific, the extended SA processing program 333 selects a record in which the SPI contained in the received packet coincides with the SPI 3378 from the SA information & SA candidate information table 337. Then, the selected record is set as SA information or SA candidate information corresponding to the received packet.

Next, the extended SA processing program 333 judges whether at least one of the SA information and the SA candidate information corresponding to the received packet has been selected from the SA information & SA candidate information table 337 (S302).

If neither the SA information nor the SA candidate information corresponding to the received packet has been selected, the extended SA processing program 333 cannot decrypt the received packet. Accordingly, the extended SA processing program 333 discards the packet (S210). Then, the process is finished.

On the other hand, if at least one of the SA information and the SA candidate information corresponding to the received packet has been selected, the extended SA processing program 333 extracts key data 3348 from the record corresponding to the selected SA information or SA candidate information. Then, the received packet is decrypted by using the extracted key data 3348 (S303).

The extended SA processing program 333 judges whether the decryption of the received packet has been successful by using the selected SA information (S304).

Upon judgment that the decryption of the received packet has been successful, the extended SA processing program 333 sends the decrypted received packet to a network processing program 331. Then, the process is finished.

On the other hand, upon failure of the decryption of the received packet, the extended SA processing program 333 judges whether the decryption of the received packet has been successful by using the selected SA candidate information (S305).

If the decryption of the received packet based on the SA candidate information has failed, the extended SA processing program 333 cannot decrypt the received packet. Accordingly, the extended SA processing program 333 discards the packet (S210). Then, the process is finished.

On the other hand, if the decryption of the received packet based on the SA candidate information has been successful, the extended SA processing program 333 executes steps S212 to S217. The steps S212 to S217 are similar to those of the received packet processing of the extended SA processing program 333 of the first embodiment shown in FIG. 9. Similar steps are denoted by similar reference numerals, and description thereof will be omitted.

Thus, the responder 3 of the second embodiment can simultaneously retrieve the SA information and the SA candidate information by being equipped with the SA information & SA candidate information table 337.

Third Embodiment

According to a third embodiment, an initiator 2 and a responder 3 directly exchange SA information with each other.

Figure 14:
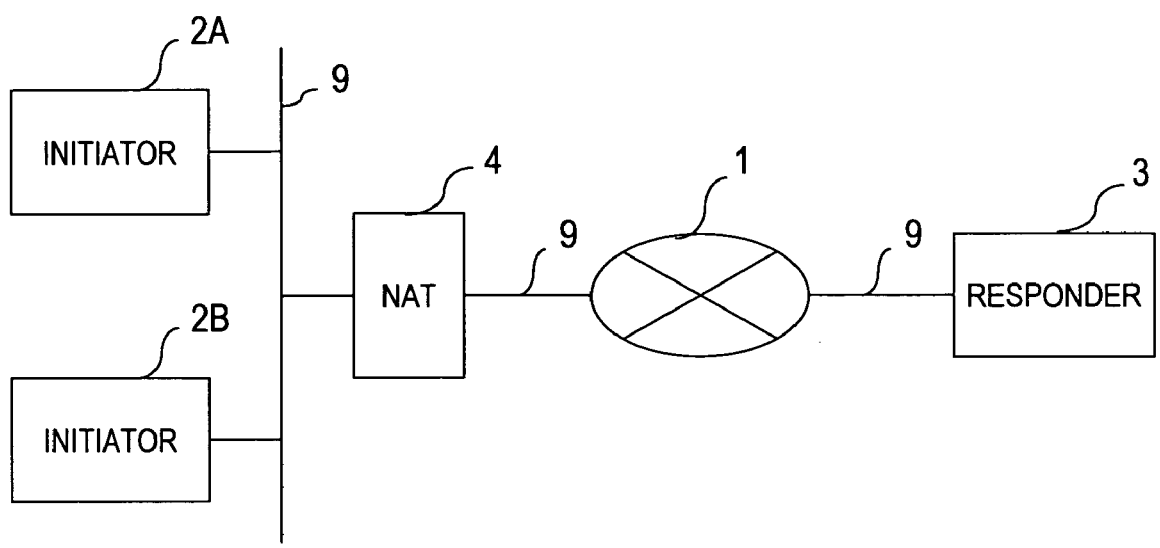
FIG. 14 is a block diagram of a computer system of a third embodiment.

FIG. 14 is a block diagram of a computer system of a third embodiment.

The computer system of the third embodiment does not include a SIP proxy 6. The other components of the computer system of the third embodiment are similar to those of the computer system of the first embodiment shown in FIG. 1. Similar components are denoted by similar reference numerals, and description thereof will be omitted.

Initiators 2A, 2B, . . . and a responder 3 establish SA by using key exchange protocol such as IKE.

Figure 15:
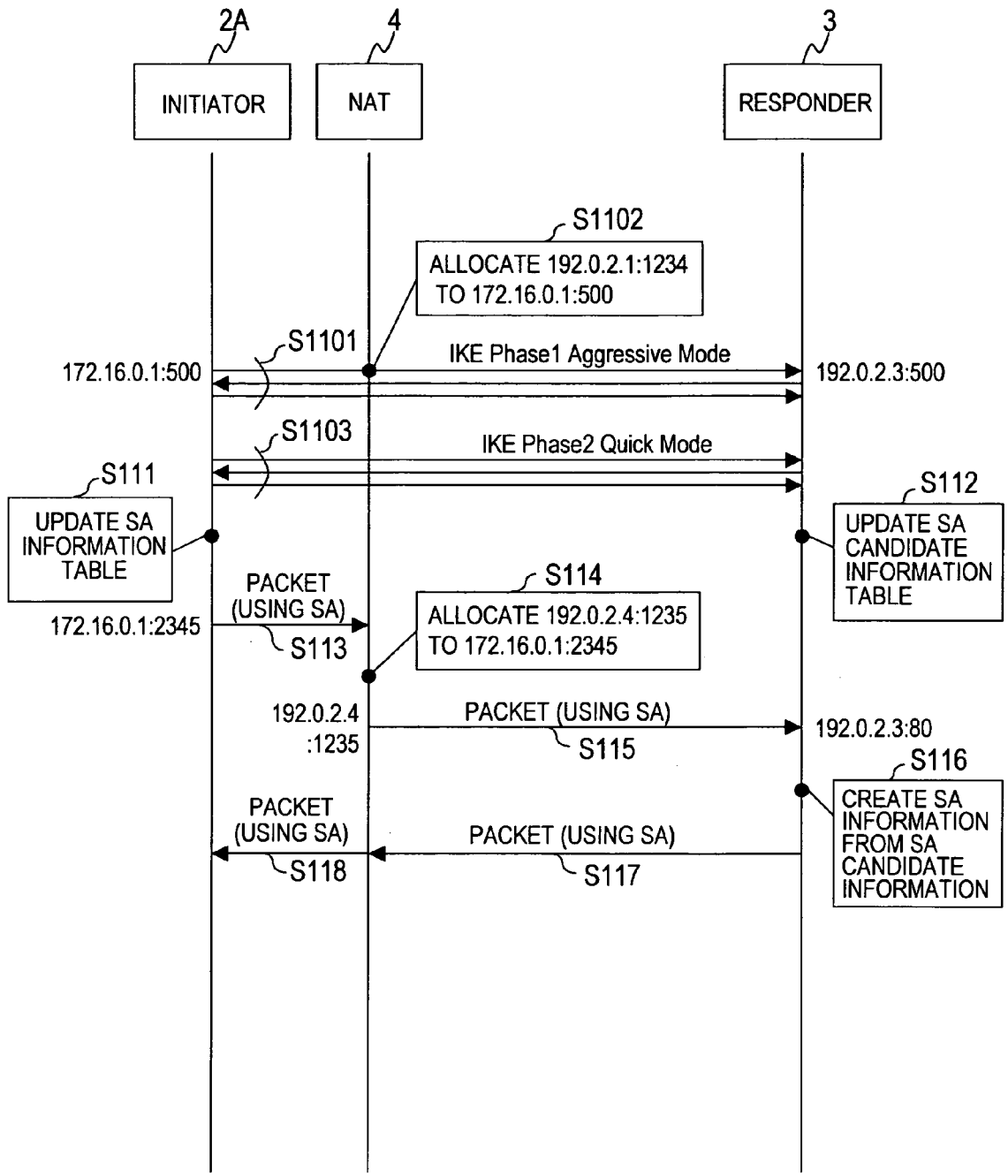
FIG. 15 is a sequence diagram showing an SA establishing process of the computer system of the third embodiment.

FIG. 15 is a sequence diagram showing an SA establishing process of the computer system of the third embodiment.

The initiator 2A and the responder 3 execute communication of Phase 1 (S1101). To be specific, the initiator 2A and the responder 3 exchange each other's ID by transmitting/receiving a packet. Then, the initiator 2A and the responder 3 decide a communication method of Phase 2.

Upon reception of a first packet from the initiator 2A, a NAT 4 allocates its address to a source address of the packet (S1102).

Then, the initiator 2A and the responder 3 carry out communication of the Phase 2 (S1103). To be specific, the initiator 2A and the responder 3 exchange SA information by transmitting/receiving a packet based on the method decided in the Phase 1. Accordingly, the initiator 2A and the responder 3 establish SA.

The computer system of the third embodiment executes steps S111 to S118.

The steps S111 to S118 are similar to those of the SA establishing process of the computer system of the first embodiment shown in FIG. 7. Similar steps are denoted by similar reference numerals, and description thereof will be omitted.

According to the third embodiment, the computer system having no SIP proxy 6 can establish SA when different addresses are used between communication for establishing SA and communication using established SA.

Fourth Embodiment

According to a fourth embodiment, a load balancer distributes packets to responders.

Figure 16:
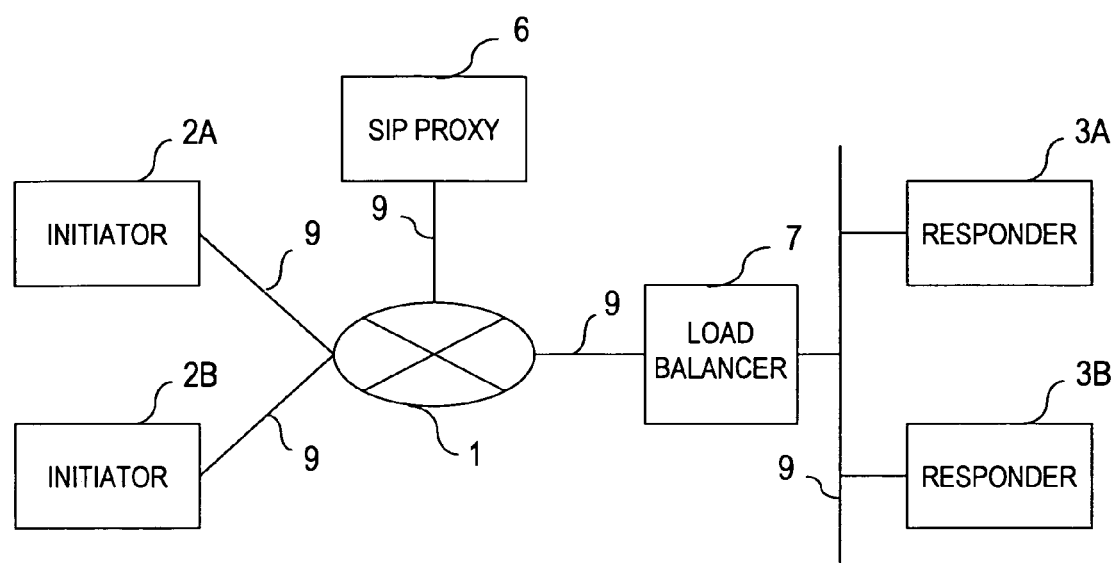
FIG. 16 is a block diagram of a computer system of the fourth embodiment.

FIG. 16 is a block diagram of a computer system of the fourth embodiment.

The computer system includes a communication network 1, initiators 2A, 2B, . . . (hereinafter, sometimes referred to collectively as "initiator 2", responders 3A, 3B, . . . (hereinafter, sometimes referred to collectively as "responder 3"), a SIP proxy 6, a load balancer 7, and a communication line 9.

The initiator 2, the SIP proxy 6, and the load balancer 7 are connected to the communication network 1 through the communication line 9. The responder 3 is connected to the load balancer 7 through the communication line 9. In other words, the responder 3 is connected to the communication network 1 via the load balancer 7.

The communication network 1, the initiator 2, the responder 3, and the SIP proxy 6 are similar in configuration to those of the computer system of the first embodiment shown in FIG. 1. Similar components are denoted by similar reference numerals, and description thereof will be omitted.

However, in the responder 3 of the fourth embodiment, the presence of the load balancer 7, the address information of the load balancer 7, and the address information of the other responder 3 are set beforehand.

The load balancer 7 translates a destination address of a packet received from the communication network 1, and transfers the packet to one of the responders 3.

Figure 17:
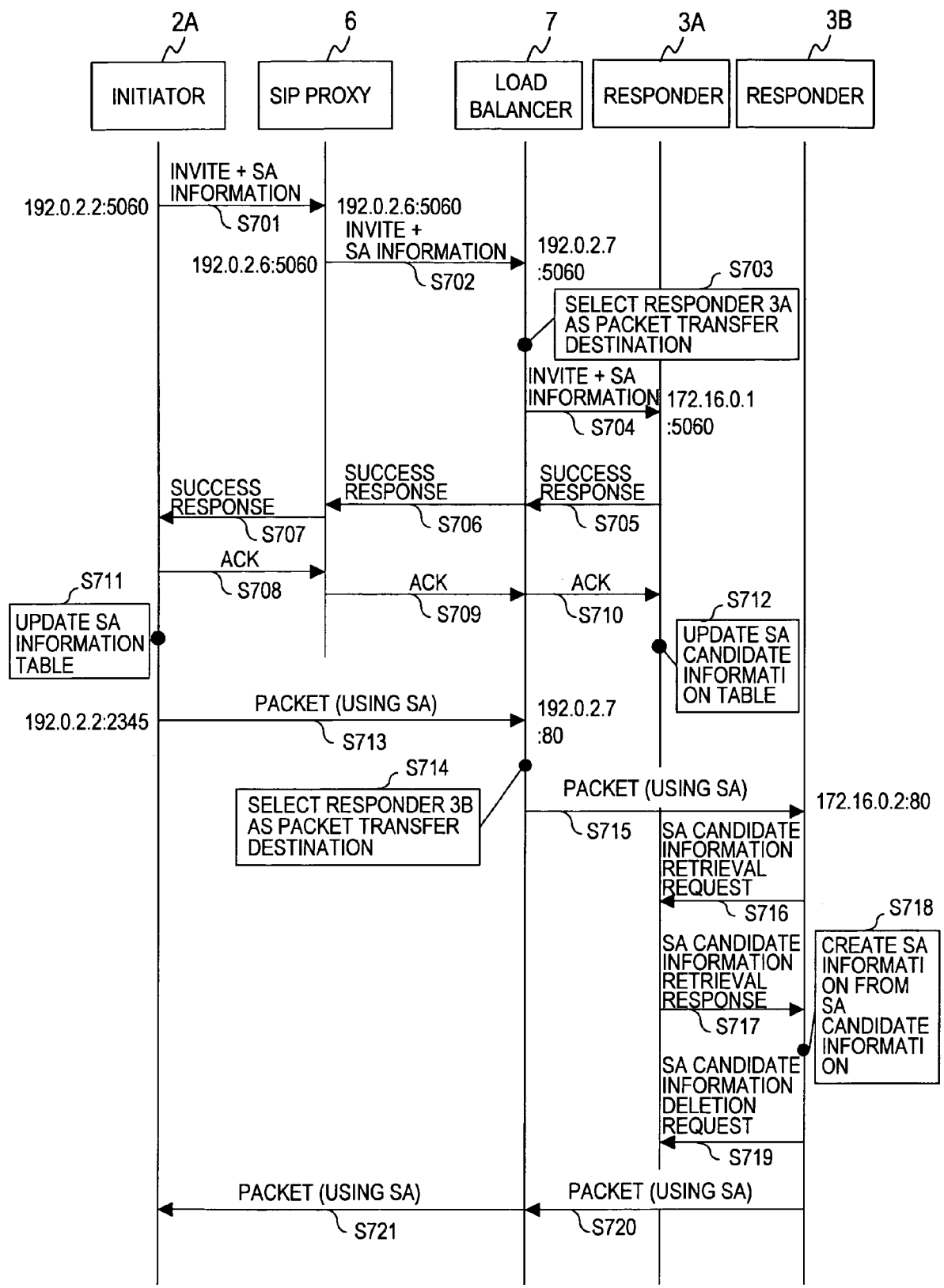
FIG. 17 is a sequence diagram showing an SA establishing process of the computer system of the fourth embodiment.

FIG. 17 is a sequence diagram showing an SA establishing process of the computer system of the fourth embodiment.

The computer system of the sequence diagram encrypts communication between a web browser operated in the initiator 2A and a web server operated in the responder 3B. Accordingly, the initiator 2A and the responder 3A exchange SA information. Subsequently, the responder 3B exchanges SA candidate information with the responder 3A to establish SA between the responder 3B and the initiator 2A.

An IP address of the initiator 2A is "192.0.2.2". An IP address of the communication network 1 side of the load balancer 7 is "192.0.2.7". An IP address of the responder 3A is "172.16.0.1". An IP address of the responder 3B is "172.16.0.2". An IP address of the SIP proxy 6 is "192.0.2.6".

With a certain opportunity, the initiator 2A judges a need to establish SA between the initiator 2A and the load balancer 7.

In this case, a network processing program 231 of the initiator 2A receives a packet transmission request from a network AP 232 of the initiator 2A. Then, the network processing program 231 requests an SA processing program 233 of the initiator 2A to establish SA. After the SA processing program 233 has received the SA establishing request, the initiator 2A judges a need to establish SA between port 2345 of the initiator 2A and port 80 of the load balancer 7.

Subsequently, the SA processing program 233 of the initiator 2A transmits a packet containing an INVITE message having proposal SA information stored therein from port 5060 of the initiator 2A to the SIP proxy 6 (S701). Port 5060 is default port of SIP. The SA information stored in the INVITE message is similar to that of the first embodiment shown in FIG. 8, and thus description thereof will be omitted.

The SIP proxy 6 receives the packet containing the INVITE message from the initiator 2A. Then, the SIP proxy 6 transfers the received packet to the load balancer 7 (S702).

The load balancer 7 receives the packet containing the INVITE message from the SIP proxy 6. Then, the load balancer 7 selects a transfer destination of the received packet from the connected responders 3. In this case, it is presumed that the load balancer 7 selects the responder 3A as a transmission destination (S703).

Then, the load balancer 7 translates a destination address of the received packet into an address "172.16.0.1:5060" of the responder 3A. The load balancer 7 transmits the address-translated packet to the responder 3A (S704).

The responder 3A receives the packet containing the INVITE message from the SIP proxy 6. Then, the responder 3A processes the received packet at the network processing program 331.

The network processing program 331 judges that the received packet contains SA information, and loads an extended SA processing program 333.

The extended SA processing program 333 inspects proposal SA information contained in the received packet. Then, the extended SA processing program 333 creates SA information for response based on the inspected proposal SA information. The SA information for response is SA information permitted to be used by the extended SA processing program 333. In this case, the extended SA processing program 333 stores address information of the load balancer 7 in the response SA information to be created in place of the address information of the responder 3A.

The extended SA processing program 333 stores the created response SA information in a success response message. The extended SA processing program 333 creates a packet containing the success response message.

Next, the network processing program 331 of the responder 3A transmits the packet created by the extended SA processing program 333 to the load balancer 7 (S705).

The load balancer 7 receives the packet containing the success response message from the network processing program 331 of the responder 3A. Then, the load balancer 7 translates a source address of the received packet into the address of the load balancer 7. The load balancer 7 transmits the address-translated packet to the SIP proxy 6 (S706).

The SIP proxy 6 receives the packet containing the success response message from the load balancer 7. Then, the SIP proxy 6 transfers the received packet to the initiator 2A (S707).

The initiator 2A receives the packet containing the success response message from the SIP proxy 6. As described above, the initiator 2A and the responder 3A exchange SA information. Then, the initiator 2A transmits a packet containing an ACK message to the SIP proxy 6 (S708).

The initiator 2A updates the SA information table 234 based on the packet received in the step S707 (S711). The updating process of the SA information table 234 of the initiator 2A is similar to the step S111 of the SA establishing process of the computer system of the first embodiment shown in FIG. 7, and thus description thereof will be omitted.

The SIP proxy 6 receives the packet containing the ACK message from the initiator 2A. Then, the SIP proxy 6 transfers the received packet to the responder 3A via the load balancer 7 (S709 and S710).

The responder 3A receives the packet containing the ACK message. Then, the responder 3A updates the SA candidate information table 335 shown in FIG. 6 because the presence of the load balancer 7 is set beforehand.

The responder 3A updates the SA candidate information table 335 based on the packet transmitted in the step S705.

To be specific, the responder 3A extracts the SA information from the packet received in the step S705. The responder 3A adds new records equal to the number of SA designated by the extracted SA information to the SA candidate information table 335.

Next, the responder 3A stores a value common among all the new added records in a pair ID 3350 of the new records. In this case, the responder 3A selects a value not overlapped with a pair ID 3350 of another record, and stores the value in the pair ID 3350 of the new records. The responder 3A stores "inbound" in a direction 3351 of a record regarding SA applied when the packet is received. On the other hand, the responder 3A stores "outbound" in a direction 3351 of a record regarding SA applied when the packet is transmitted.

The responder 3A extracts an IP address, port number, and protocol from initiator address information 902 of the extracted SA information. When "inbound" is stored in the direction 3351, the responder 3A stores the extracted IP address in a source IP address 3352 of the new record. On the other hand, when "outbound" is stored in the direction 3351, the responder 3A stores the extracted IP address in a destination IP address 3354 of the new record.

When "inbound" is stored in the direction 3351, the responder 3A stores the extracted port number in a source port 3353 of the new record. On the other hand, when "outbound" is stored in the direction 3351, the responder 3A stores the extracted port number in a destination port 3355 of the new record. Then, the extracted protocol is stored in protocol 3356 of the new record.

Upon storage of "inbound" in the direction 3351, the responder 3A stores "undetermined" in the destination IP address 3354 and the destination port 3355 of the new record. On the other hand, upon storage of "outbound" in the direction 3351, the responder 3A stores "undetermined" in the source IP address 3352 and the source port 3353 of the new record.

Next, the responder 3A extracts SPI and a lifetime from policy information 901 of the extracted SA information. The extracted SPI is stored in an SPI 3357 of the new record. The extracted lifetime is stored in a lifetime 3359 of SA of the new record.

The responder 3A generates key data based on key generation information 904 of the extracted SA information. Then, the responder 3A stores the generated key data in key data 3358 of the new record.

The responder 3A stores a preset value in a lifetime 3360 of an SA candidate of the new record.

As described above, the responder 3A updates the SA candidate information table 335 (S712).

It is presumed that a network AP 232 of the initiator 2A requests transmission of a packet to the network processing program 231 of the initiator 2A. The source port of the packet is port 2345 of the initiator 2A, and the destination port of the packet is port 80 of the load balancer 7. In this case, the packet requested to be transmitted by the network AP 232 may be a packet which has given the opportunity of establishing SA and which has been buffered.

The network processing program 231 of the initiator 2A receives the packet transmission request from the network AP 232. Then, the network processing program 231 loads an SA processing program 233 of the initiator 2A to provide a security function to the packet to be transmitted.

The SA processing program 233 extracts a source IP address, a source port, a destination IP address, and a destination port from the transmitted packet. Then, The SA processing program 233 selects records whose source IP address 2342 is equal to the extracted source IP address and whose source port 2343 is equal to the extracted source port from the SA information table 234.

The SA processing program 233 selects records whose destination IP address 2344 is equal to the extracted destination IP address and whose destination port 2345 is equal to the destination port 2345 from the above selected records.

The SA processing program 233 encrypts the transmitted packet based on key data 2348 of the selected record. The encryption process of the SA processing program 233 is similar to that of conventional IPsec or the like.

The network processing program 231 of the initiator 2A transmits the packet encrypted by the SA processing program 233 to the load balancer 7 (S713).

The load balancer 7 receives the packet from the initiator 2A. Then, the load balancer 7 selects a transfer destination of the received packet from the connected responders 3. In this case, it is presumed that the load balancer 7 selects the responder 3B as a transfer destination (S714).

The load balancer 7 translates a destination address of the received packet into an address "172.16.0.2:80" of the responder 3B. Then, the load balancer 7 transmits the address-translated packet to the responder 3B (S715).

The responder 3B receives the packet from the load balancer 7. Then, the responder 3B processes the received packet by the network processing program 331.

The network processing program 331 judges that the received packet has been encrypted to load the extended SA processing program 333.

The extended SA processing program 333 processes the received packet. The received packet processing of the extended SA processing program 333 will be described below in detail referring to FIGS. 18A and 18B.

In this case, the responder 3B cannot decrypt the received packet by using the SA information table 334 and the SA candidate information table 335 of the responder 3B. Accordingly, the responder 3B transmits an SA candidate information retrieval request to all the other responders 3B (S716). The SA candidate information retrieval request contains retrieval conditions.

The responder 3A extracts SA candidate information which satisfies the retrieval conditions from the SA candidate information table 335 of the responder 3A. Then, the responder 3A creates an SA candidate information retrieval response containing the extracted SA candidate information. The responder 3A transmits the created SA candidate information retrieval response to the responder 3B (S717).

The responder 3B receives the SA candidate information retrieval response. Then, the responder 3B decrypts the received packet by using the SA candidate information contained in the received SA candidate information retrieval response. If the decryption of the packet has been successful, the responder 3B creates SA information based on the SA candidate information (S718).

The responder 3B stores the created SA information in the SA information table 334 of the responder 3B. Then, the responder 3B transmits a deletion request of the used SA candidate information to the responder 3A (S719). The responder 3A deletes the used SA candidate information from the SA candidate information table 335 of the responder 3A.

Subsequently, it is presumed that the network AP 332 of the responder 3B has requested transmission of a packet to the network processing program 331 of the responder 3B.

The network processing program 331 of the responder 3B receives the packet transmission request from the network AP 332. Then, the network processing program 331 loads the extended SA processing program 333 of the responder 3B to provide a security function to the transmitted packet.

The extended SA processing program 333 encrypts the transmitted packet. The transmitted packet processing of the extended SA processing program 333 is similar to that of the first embodiment shown in FIG. 10, and thus description thereof will be omitted.

The network processing program 331 of the responder 3B transmits the packet encrypted by the extended SA processing program 333 to the initiator 2A (S720).

The load balancer 7 receives a packet from the responder 3B. Then, the load balancer 7 translates a source address of the received packet into an address of the load balancer 7. The load balancer 7 transmits the address-translated packet to the initiator 2A (S721).

The initiator 2A receives the packet from the load balancer 7. Then, the initiator 2A processes the received packet by the network processing program 231. The network processing program 231 judges that the received packet has been encrypted to load the SA processing program 233.

The SA processing program 233 refers to the SA information table 234 to decrypt the received packet. The decryption process of the SA processing program 233 is similar to that in conventional IPsec or the like.

Figure 18A:
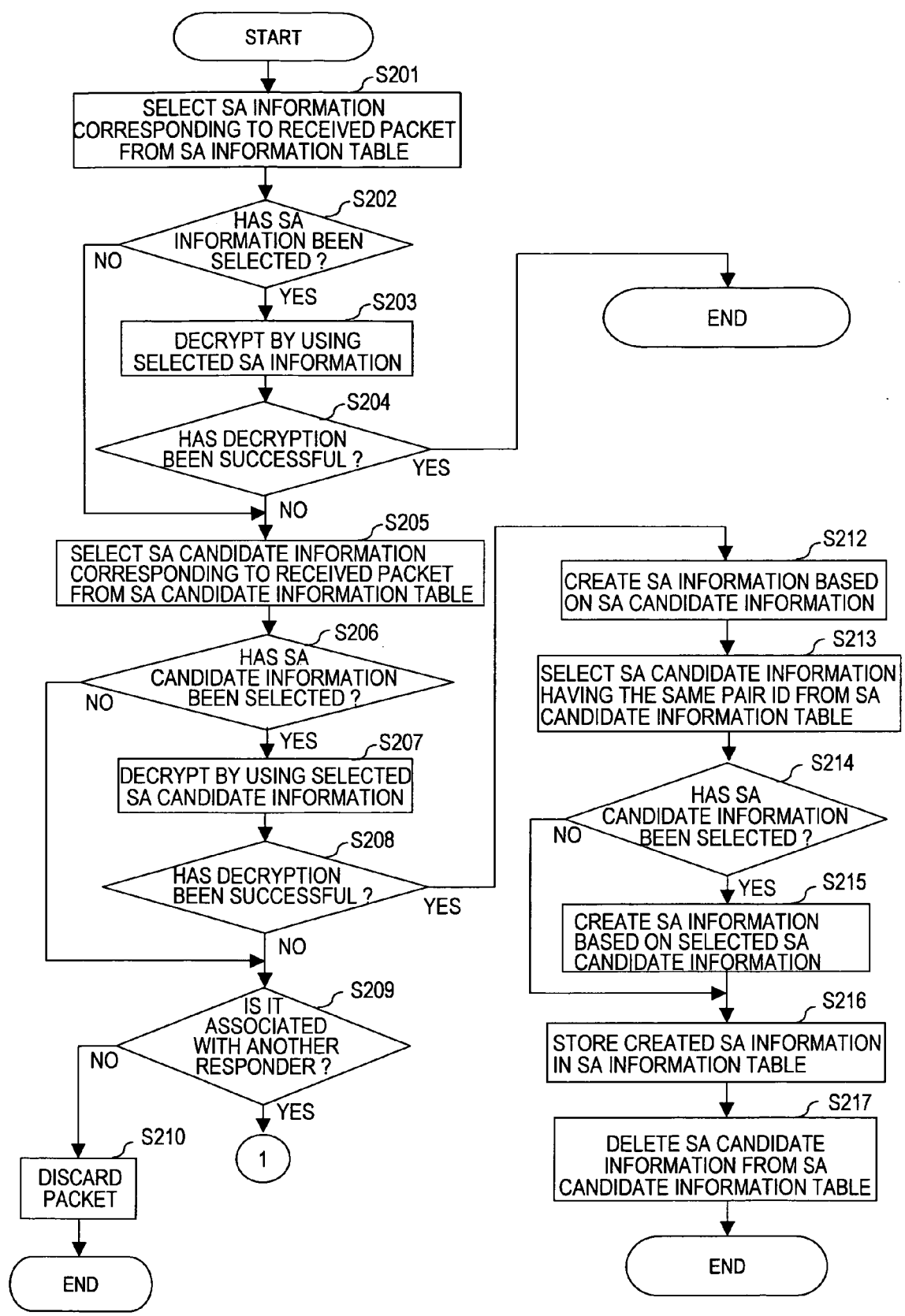
FIG. 18A is a flowchart showing the received packet processing of the extended SA processing program according to the fourth embodiment.
Figure 18B:
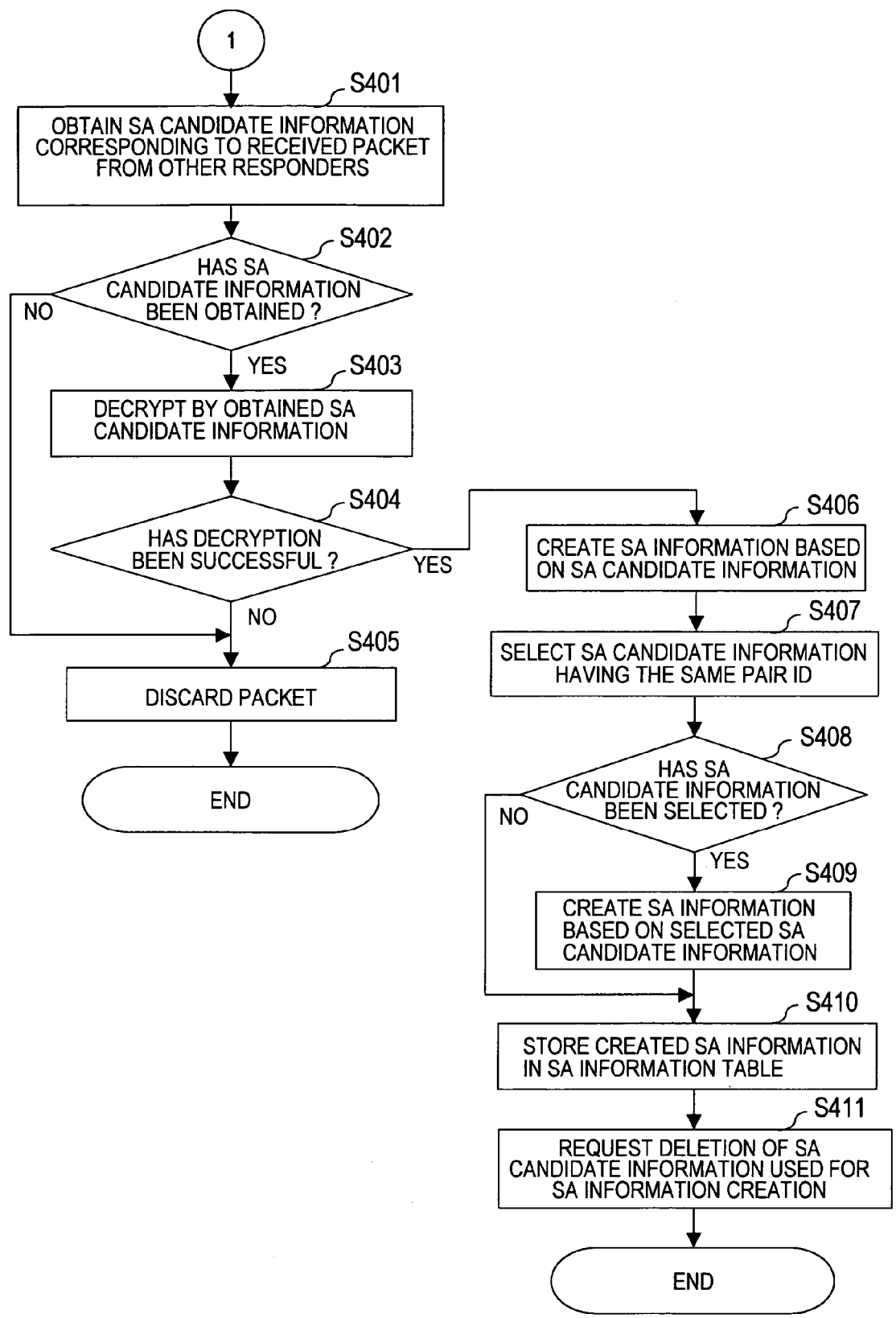
FIG. 18B is a flowchart showing the received packet processing of the extended SA processing program according to the fourth embodiment.

FIGS. 18A and 18B are flowcharts showing the received packet processing of the extended SA processing program according to the fourth embodiment.

First, the extended SA processing program 333 executes steps S201 to S208. The steps S201 to S208 are similar to those of the received packet processing of the extended SA processing program 333 of the first embodiment shown in FIG. 9. Similar steps are denoted by similar reference numerals, and description thereof will be omitted.

Upon judgment that the decryption of the received packet has been successful in the step S208, the extended SA processing program 333 executes steps S212 to S217. The steps S212 to S217 are similar to those of the received packet processing of the extended SA processing program 333 of the first embodiment. Similar steps are denoted by similar reference numerals, and description thereof will be omitted.

On the other hand, upon failure of the decryption of the received packet in the step S208, the extended SA processing program 333 judges whether it is possible to obtain SA candidate information from another device. To be specific, the extended SA processing program 333 judges whether the responder 3 equipped with the extended SA processing program 333 is associated with the other responder 3 (S209).

Upon judgment that the responder 3 is not associated with the other responder 3, the extended SA processing program 333 cannot decrypt the received packet. Accordingly, the extended SA processing program 333 discards the packet (S210). Then, the process is finished.

On the other hand, upon judgment that the responder 3 is associated with the other responder 3, the extended SA processing program 333 decrypts the received packet by using SA candidate information of the other responder 3.

To be specific, the extended SA program 333 transmits an SA candidate information retrieval request to all the responders 3 other than itself. The SA candidate information retrieval request contains at least one of SPI and address information of the received packet as a retrieval condition.

Upon reception of the SA candidate information retrieval request, each of the other responders 3 extracts the SPI or the address information of the received packet from the SA candidate information retrieval request. The other responders 3 try to select SA candidate information corresponding to the received packet from its own SA candidate information table 335 based on the extracted SPI or address information. The selection process of the SA candidate information of the responder 3 is similar to that of the step S205. Thus, detailed description thereof will be omitted. If one of the other responders 3 selects any SA candidate information, the other responder 3 selects SA candidate information having the same pair ID as that of the selected SA candidate information from its own SA candidate information table 335.

Then, the other responder 3 sends back the SA candidate information retrieval response containing the selected SA candidate information to the extended SA processing program 333 of the responder 3.

The extended SA processing program 333 of the responder 3 receives the SA candidate information retrieval response. Accordingly, the extended SA processing program 333 obtains SA candidate information corresponding to the received packet from other responders 3 (S401).

Next, the extended SA processing program 333 judges whether any SA candidate information corresponding to the received packet has been obtained (S402).

If no SA candidate information corresponding to the received packet has been obtained, the extended SA processing program 333 cannot decrypt the received packet. Thus, the extended SA processing program 333 discards the packet (S405). Then, the process is finished.

On the other hand, if any SA candidate information corresponding to the received packet has been obtained, the extended SA processing program 333 extracts key data from the obtained SA candidate information. Then, the received packet is decrypted by using the extracted key data (S403).

Next, the extended SA processing program 333 judges whether the decryption of the received packet has been successful (S404).

Upon failure of the decryption of the received packet, the extended SA processing program 333 cannot decrypt the received packet. Thus, the extended SA processing program 333 discards the packet (S405). Then, the process is finished.

On the other hand, upon success of the decryption of the received packet, the extended SA processing program 333 creates SA information based on the SA candidate information that successfully decrypts the received packet and a destination address of the received packet (S406).

The extended SA processing program 333 extracts a pair ID from the SA candidate information. Then, the SA candidate information having the same pair ID as that of the extracted pair ID is selected from the SA candidate information obtained in the step S401 (S407).

The extended SA processing program 333 judges whether the SA candidate information having the same pair ID has been selected (S408).

If the SA candidate information having the same pair ID has not been selected, the extended SA processing program 333 directly proceeds to step S410.

On the other hand, if the SA candidate information having the same pair ID has been selected, the extended SA processing program 333 creates SA information based on the selected SA candidate information and the destination address of the received packet (S409).

Accordingly, the extended SA processing program 333 creates transmission (outbound) SA information corresponding to the reception (inbound) SA information created in the step S406.

The extended SA processing program 333 stores the created SA information in the SA information table 335 (S410).

The extended SA processing program 333 transmits a deletion request of the used SA candidate information to the responder 3 that has the used SA candidate information (S411). The deletion request of the SA candidate information contains at least one of the SPI and the address information of the received packet as a deletion condition.

The extended SA processing program 333 transmits the decrypted received packet to the network processing program 331. Then, the process is finished.

On the other hand, upon reception of the deletion request of the SA candidate information, the other responder 3 deletes the used SA candidate information from its own SA candidate information table 335.

The load balancer 7 cannot correlate communication for establishing SA and communication using the established SA with each other. Accordingly, there is a possibility that the load balancer 7 will distribute communication for establishing SA and communication using the established SA to the different responders 3. Even in this case, the initiator 2 and the responder 3 of the fourth embodiment can establish SA.

Fifth Embodiment

According to a fifth embodiment, a database manages all pieces of SA candidate information.

Figure 19:
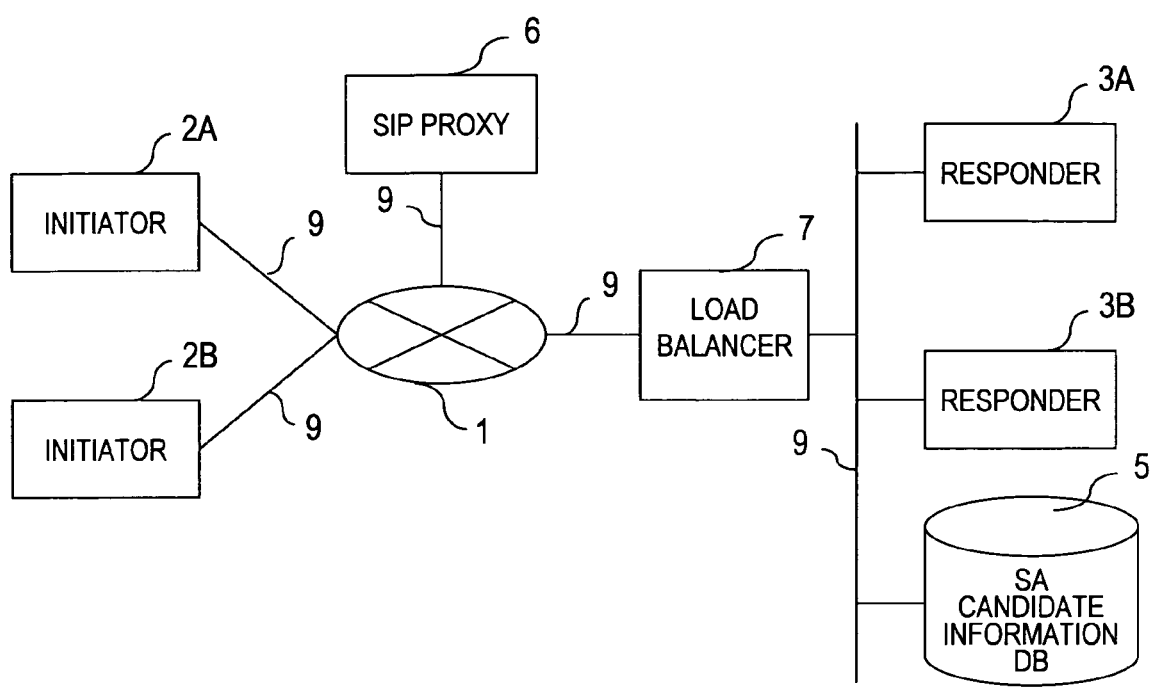
FIG. 19 is a block diagram of a computer system of the fifth embodiment.

FIG. 19 is a block diagram of a computer system of the fifth embodiment.

The computer system of the fifth embodiment includes an SA candidate information database (SA candidate information DB) 5. The other configurations of the computer system of the fifth embodiment are similar to those of the computer system of the fourth embodiment shown in FIG. 16. Similar components are denoted by similar reference numerals, and description thereof will be omitted.

In a responder 3 of the fifth embodiment, an SA candidate information table 335 may be or may not be stored in a memory 33. In the responder 3, presence of a load balancer 7, address information of the load balancer 7, and address information of the SA candidate information DB 5 are set beforehand.

The SA candidate information DB 5 is a database device realized by a storage system such as a hard disk, and stores the SA candidate information table 335. The SA candidate information DB 5 updates the stored SA candidate information table 335 according to a request from a responder 3.

Figure 20:
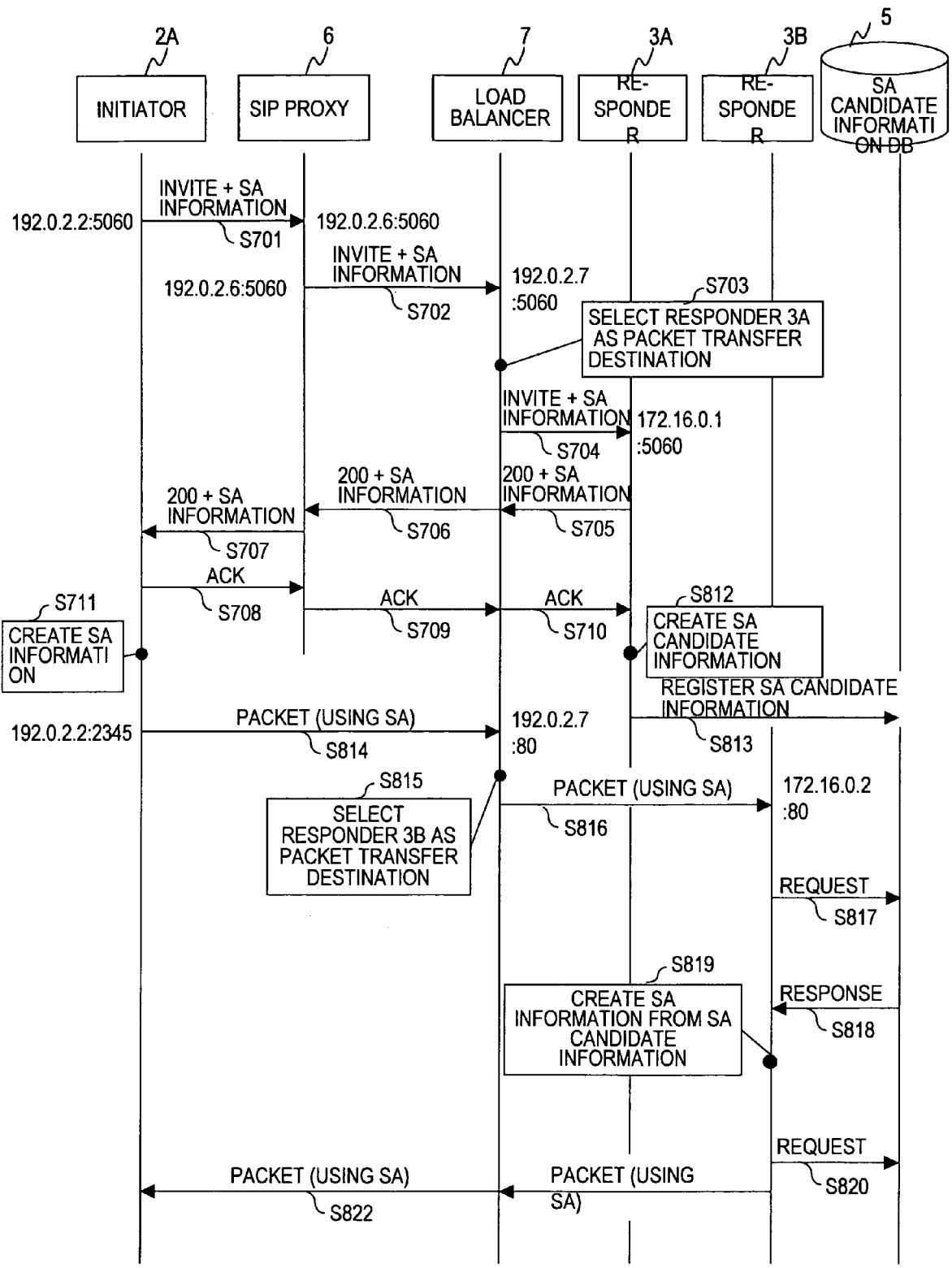
FIG. 20 is a sequence diagram showing an SA establishing process of the computer system of the fifth embodiment.

FIG. 20 is a sequence diagram showing an SA establishing process of the computer system of the fifth embodiment.

The computer system of the flowchart encrypts communication between a web browser operated in an initiator 2A and a web server operated in a responder 3B. Accordingly, the initiator 2A and a responder 3A exchange SA information. Subsequently, the responder 3A creates SA candidate information based on the exchanged SA information. The responder 3A registers the created SA candidate information in the SA candidate information DB 5. Then, the responder 3B retrieves the SA candidate information from the SA candidate information DB 5 to establish SA with the initiator 2A.

An IP address of the initiator 2A is "192.0.2.2". An IP address of a communication network 1 side of the load balancer 7 is "192.0.2.7". An IP address of the responder 3A is "172.16.0.1". An IP address of the responder 3B is "172.16.0.2". An IP address of a SIP proxy 6 is "192.0.2.6".

First, the computer system executes steps S701 to S711. The steps S701 to S711 are similar to those of the SA establishing process of the computer system of the fourth embodiment shown in FIG. 17. Similar steps are denoted by similar reference numerals, and description thereof will be omitted.

The responder 3A receives a packet containing an ACK message in the step S710. Then, the responder 3A creates SA candidate information because the presence of the load balancer 7 has been set (S812). The responder 3A transmits SA candidate information to the SA candidate information DB 5 to store the created SA candidate information in the SA candidate information table 335 of the SA candidate information DB 5 (S813).

To be specific, the responder 3A extracts the SA information from the packet transmitted in the step S705. The responder 3A adds new records equal to the number of SA designated by the extracted SA information to the SA candidate information table 335 of the SA candidate information DB 5.

Next, the responder 3A stores a value common among all the new added records in a pair ID 3350 of the new records. In this case, the responder 3A selects a value not overlapped with a pair ID 3350 of the other record, and stores it in the pair ID 3350 of the new record.

The responder 3A stores "inbound" in a direction 3351 of a record regarding SA applied when the packet is received. On the other hand, the responder 3A stores "outbound" in a direction 3351 of a record regarding SA applied when the packet is transmitted.

The responder 3A extracts an IP address, port number, and protocol from initiator address information 902 of the extracted SA information. When "inbound" is stored in the direction 3351, the responder 3A stores the extracted IP address in a source IP address 3352 of the new record. On the other hand, when "outbound" is stored in the direction 3351, the responder 3A stores the extracted IP address in a destination IP address 3354 of the new record.

When "inbound" is stored in the direction 3351, the responder 3A stores the extracted port number in a source port 3353 of the new record. On the other hand, when "outbound" is stored in the direction 3351, the responder 3A stores the extracted port number in a destination port 3355 of the new record. Then, the extracted protocol is stored in protocol 3356 of the new record.

Upon storage of "inbound" in the direction 3351, the responder 3A stores "undetermined" in the destination IP address 3354 and the destination port 3355 of the new record. On the other hand, upon storage of "outbound" in the direction 3351, the responder 3A stores "undetermined" in the source IP address 3352 and the source port 3353 of the new record.

Next, the responder 3A extracts SPI and a lifetime from policy information 901 of the extracted SA information. The extracted SPI is stored in SPI 3357 of the new record. The extracted lifetime is stored in a lifetime 3359 of SA of the new record.

The responder 3A generates key data based on key generation information 904 of the extracted SA information. Then, the responder 3A stores the generated key data in key data 3358 of the new record.

The responder 3A stores a preset value in a lifetime 3360 of an SA candidate of the new record.

As described above, the responder 3A updates the SA candidate information table 335 of the SA candidate information DB 5. The responder 3A updates the SA candidate information table 335 if the responder 3A has the SA candidate information table 335 stored therein itself.

It is presumed that a network AP 232 of the initiator 2A requests transmission of a packet to a network processing program 231 of the initiator 2A. The source port of the packet is port 2345 of the initiator 2A, and the destination port of the packet is port 80 of the load balancer 7.

The network processing program 231 of the initiator 2A receives the packet transmission request from the network AP 232. Then, the network processing program 231 loads an SA processing program 233 of the initiator 2A to provide a security function to the packet to be transmitted.

The SA processing program 233 extracts a source IP address, a source port, a destination IP address, and a destination port from the transmitted packet. Then, The SA processing program 233 selects records whose source IP address 2342 is equal to the extracted source IP address and whose source port 2343 is equal to the extracted source port from the SA information table 234.

The SA processing program 233 selects records whose destination IP address 2344 is equal to the extracted destination IP address and whose destination port 2345 is equal to the extracted destination port from the above selected records.

The SA processing program 233 encrypts the transmitted packet based on key data 2348 of the selected record. The encryption process of the SA processing program 233 is similar to that of conventional IPsec or the like.

The network processing program 231 of the initiator 2A transmits the packet encrypted by the SA processing program 233 to the load balancer 7 (S814).

The load balancer 7 receives the packet from the initiator 2A. Then, the load balancer 7 selects a transfer destination of the received packet from the connected responders 3. In this case, it is presumed that the load balancer 7 selects the responder 3B as a transfer destination (S815).

The load balancer 7 translates a destination address of the received packet into an address "172.16.0.2:80" of the responder 3B. Then, the load balancer 7 transmits the address-translated packet to the responder 3B (S816).

The responder 3B receives the packet from the load balancer 7. Then, the responder 3B processes the received packet by the network processing program 331.

The network processing program 331 judges that the received packet has been encrypted to load an extended SA processing program 333.

The extended SA processing program 333 processes the received packet. The received packet processing of the extended SA processing program 333 will be described below in detail referring to FIGS. 21A and 21B.

In this case, the responder 3B cannot decrypt the received packet based on the SA information table 334 and the SA candidate information table 335 of the responder 3B. Accordingly, the responder 3B transmits an SA candidate information retrieval request to the SA candidate information DB 5 (S817). The SA candidate information retrieval request contains retrieval conditions.

The SA candidate information DB 5 extracts SA candidate information which satisfies the retrieval conditions contained in the received SA candidate information retrieval request, from the SA candidate information table 335 of the SA candidate information DB 5. Then, the SA candidate information DB 5 creates an SA candidate information retrieval response containing the extracted SA candidate information. The SA candidate information DB 5 transmits the created SA candidate information retrieval response to the responder 3B (S818).

The responder 3B receives the SA candidate information retrieval response from the SA candidate information DB 5. Then, the responder 3B decrypts the received packet by using the SA candidate information contained in the received SA candidate information retrieval response. The responder 3B creates SA information based on the used SA candidate information (S819).

The responder 3B stores the created SA information in the SA information table 334 of the responder 3B. Then, the responder 3B transmits a deletion request of the used SA candidate information to the SA candidate information DB 5 (S820). The SA candidate information DB 5 deletes the used SA candidate information from the SA candidate information table 335 of the SA candidate information DB 5.

Subsequently, it is presumed that the network AP 332 of the responder 3B has requested transmission of a packet to the network processing program 331 of the responder 3.

The network processing program 331 of the responder 3 receives the packet transmission request from the network AP 332. Then, the network processing program 331 loads the extended SA processing program 333 of the responder 3B to provide a security function to the transmitted packet.

The extended SA processing program 333 encrypts the transmitted packet. The transmitted packet processing of the extended SA processing program 333 is similar to that of the first embodiment shown in FIG. 10, and thus description thereof will be omitted.

The network processing program 331 of the responder 3B transmits the packet encrypted by the extended SA processing program 333 to the initiator 2A (S821).

The load balancer 7 receives a packet from the responder 3B. Then, the load balancer 7 translates a source address of the received packet into an address of the load balancer 7. The load balancer 7 transmits the address-translated packet to the initiator 2A (S721).

The initiator 2A receives the packet from the load balancer 7. Then, the initiator 2A processes the received packet by the network processing program 231. The network processing program 231 judges that the received packet has been encrypted to load the SA processing program 233.

The SA processing program 233 refers to the SA information table 234 to decrypt the received packet. The decryption process of the SA processing program 233 is similar to that in conventional IPsec or the like.

Figure 21A:
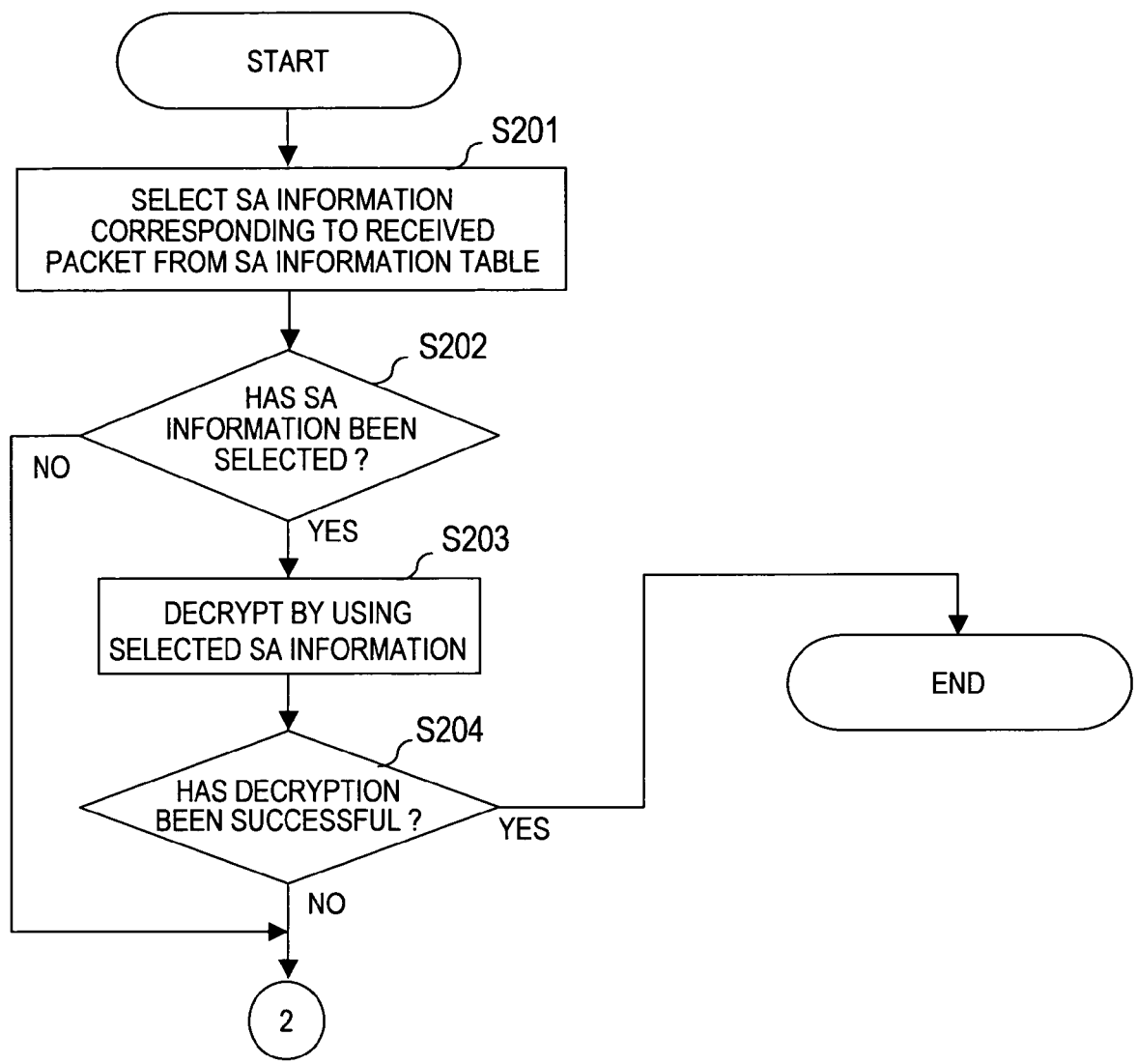
FIG. 21A is a flowchart showing the received packet processing of the extended SA processing program according to the fifth embodiment.
Figure 21B:
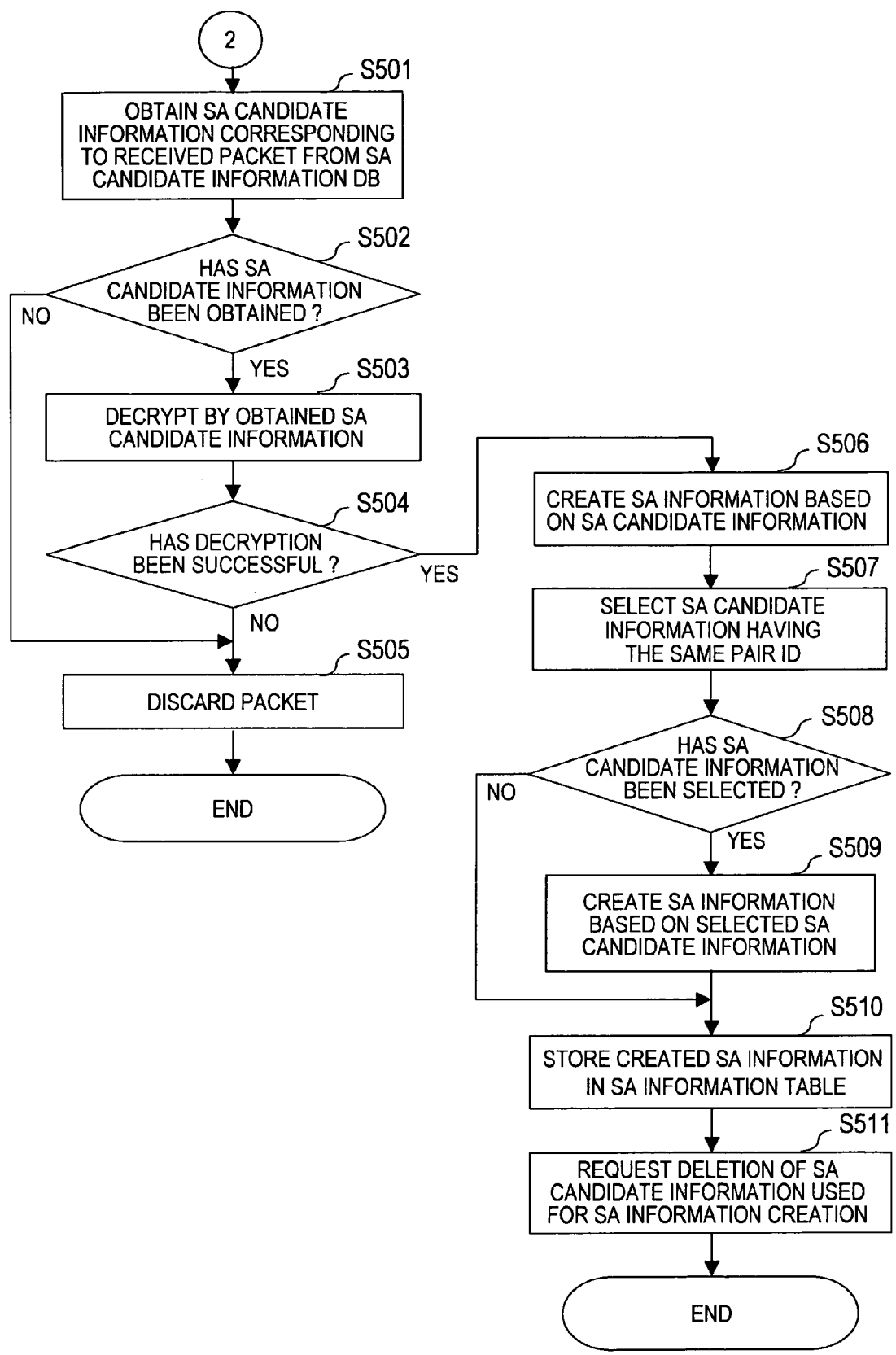
FIG. 21B is a flowchart showing the received packet processing of the extended SA processing program 333 according to the fifth embodiment.

FIGS. 21A and 21B are flowcharts showing the received packet processing of the extended SA processing program 333 according to the fifth embodiment.

First, the extended SA processing program 333 executes steps S201 to S204. The steps S201 to S204 are similar to those of the received packet processing of the extended SA processing program 333 of the first embodiment shown in FIG. 9. Similar steps are denoted by similar reference numerals, and description thereof will be omitted.

The extended SA program 333 transmits an SA candidate information retrieval request to the SA candidate information DB 5. The SA candidate information retrieval request contains at least one of SPI and address information of the received packet as a retrieval condition.

Upon reception of the SA candidate information retrieval request, the SA candidate information DB 5 extracts the SPI or the address information of the received packet from the SA candidate information retrieval request. The SA candidate information DB 5 selects SA candidate information corresponding to the received packet from the SA candidate information table 335 based on the extracted SPI or address information. The selection process of the SA candidate information regarding the SA candidate information DB 5 is similar to the step S205 of the received packet processing of the extended SA processing program 333 of the first embodiment shown in FIG. 9. Thus, detailed description thereof will be omitted.

The SA candidate information DB 5 selects an SA candidate information retrieval request having the same pair ID as that of the selected SA candidate information from the SA candidate information table 335.

Then, the SA candidate information DB 5 transmits the SA candidate information retrieval response containing the selected SA candidate information to the extended SA processing program 333 of the responder 3. Accordingly, the extended SA processing program 333 of the responder 3 obtains SA candidate information corresponding to the received packet from the SA candidate information DB 5 (S501).

Next, the extended SA processing program 333 judges whether any SA candidate information corresponding to the received packet has been obtained (S502).

If no SA candidate information corresponding to the received packet has been obtained, the extended SA processing program 333 cannot decrypt the received packet. Thus, the extended SA processing program 333 discards the packet (S505). Then, the process is finished.

On the other hand, if any SA candidate information corresponding to the received packet has been obtained, the extended SA processing program 333 extracts key data from the obtained SA candidate information. Then, the received packet is decrypted by using the extracted key data (S503).

Next, the extended SA processing program 333 judges whether the decryption of the received packet has been successful (S504).

Upon failure of the decryption of the received packet, the extended SA processing program 333 cannot decrypt the received packet. Thus, the extended SA processing program 333 discards the packet (S505). Then, the process is finished.

On the other hand, upon success of the decryption of the received packet, the extended SA processing program 333 creates SA information based on the SA candidate information that successfully decrypts the received packet and a destination address of the received packet (S506).

The extended SA processing program 333 extracts a pair ID from the SA candidate information. Then, the SA candidate information having the same pair ID as that of the extracted pair ID is selected from the SA candidate information obtained in the step S501 (S507).

The extended SA processing program 333 judges whether the SA candidate information having the same pair ID has been selected (S508).

If no SA candidate information having the same pair ID has been selected, the extended SA processing program 333 directly proceeds to step S510.

On the other hand, if the SA candidate information having the same pair ID has been selected, the extended SA processing program 333 creates SA information based on the selected SA candidate information and the destination address of the received packet (S509).

Accordingly, the extended SA processing program 333 creates transmission (outbound) SA information corresponding to the reception (inbound) SA information created in the step S506.

The extended SA processing program 333 stores the created SA information in the SA information table 335 (S510).

The extended SA processing program 333 transmits a deletion request of the used SA candidate information to the SA candidate information DB 5 (S511). The deletion request of the used SA candidate information contains at least one of the SPI and the address information of the received packet as a deletion condition.

The extended SA processing program 333 transmits the decrypted received packet to the network processing program 331. Then, the process is finished.

On the other hand, upon reception of the deletion request of the used SA candidate information, the SA candidate information DB 5 deletes the used SA candidate information from its own SA candidate information table 335.

According to the embodiment, the SA candidate information DB 5 manages the SA candidate information. Hence, it is possible to reduce loads on the responder 3.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
    a first computer including a first processor, a first memory, and a first interface;
    a plurality of second computers each including a second processor, a second memory, and a second interface; and
    a load balancer configured to balance loads of the plurality of second computers, wherein:
    each of the second computers is configured to directly establish a security association with the first computer,
    the load balancer is further configured to transfer a packet received from the first computer to one of the plurality of second computers;
    the second memory of each of the second computers is configured to store a set of inbound SA candidate information designating an inbound safe communication path, in which address information of a destination remains unknown, and outbound SA candidate information designating an outbound safe communication path, in which address information of a source remains unknown;
    the second processor of one of the second computers is configured to decrypt a packet encrypted by the first computer by using the stored inbound SA candidate information or inbound SA candidate information stored in a different one of the second computers upon reception of the encrypted packet or inbound SA candidate information stored in a different one of the second computers; and the second processor of the one of the second computers is further configured to create a set of inbound SA information outbound SA information, by designating the address information of the destination of the inbound safe communication path and the address information of the source of the outbound safe communication path based on the set of the inbound SA candidate information and the outbound SA candidate information and destination address information of the encrypted packet, and to store the created set of the inbound SA information and the outbound SA information on the second memory for successive safe communications with the first processor, upon successful decryption of the encrypted packet.

2. The computer system according to claim 1, wherein the second processor is further configured to create the set of the inbound SA candidate information and the outbound SA candidate information instead of the set of the inbound SA information and the outbound SA information upon reception of an SA request packet for requesting to establish secure association from the first computer.

3. The computer system according to claim 1, wherein:
a lifetime is set for the set of the inbound SA candidate information and the outbound SA candidate information; and
the second processor is further configured to delete from the second memory the set of the inbound SA candidate information and the outbound SA candidate information when the set has passed the lifetime from the second memory.

4. The computer system according to claim 1, further comprising an SA candidate information database configured to store the inbound SA candidate information and outbound SA candidate information, wherein the second processor is further configured to decrypt the encrypted packet by using the SA candidate information stored by the SA candidate information database.

5. A computer system, comprising:
a first computer including a first processor, a first memory, and a first interface connecting the first computer to devices reside in a first network;
a second computer including a second processor, a second memory, and a second interface connecting the second computer to devices reside in a second network; and
a NAT device bridging the first network to the second network, wherein:
the NAT device is configured, upon reception of a packet from the first computer, to translate source address information of the received packet and to transfer the translated packet to the second computer;
the second computer is configured, when the second computer receives a SA request packet for requesting to establish a security association with the first computer, which is transferred from the NAT device, to create a set of inbound SA candidate information designating an inbound safe communication path, in which address information of a source remains unknown, and outbound SA candidate information designating an outbound safe communication path, in which address information of a destination remains unknown based on the received SA request packet, and to store the created set of the inbound SA candidate information and the outbound SA candidate information on the second memory; and the second computer is further configured, when the second computer receives an encrypted packet which is encrypted according to the established security association, to decrypt the encrypted packet by using the inbound SA candidate information, create a set of inbound SA information and outbound SA information, by designating the address information of the source of the inbound safe communication path and the address information of the destination of the outbound safe communication path based on the set of the inbound SA candidate information and the outbound SA candidate information and source address information of the encrypted packet, and store the created set of the inbound SA information and the outbound SA information on the second memory for successive safe communications with the first processor, upon successful decryption of the encrypted packet.

6. The computer system according to claim 5, further comprising a proxy computer for assuring security of communication between the first and second computers, wherein:
the proxy computer is configured to determine whether or not address information of the received SA request packet has been translated by the NAT device upon reception of the SA request packet from the first computer, and to notify the address translation of the received SA request packet to the second computer upon determination that the address information of the received SA request packet has been translated by the NAT device; and
the second processor is further configured to determine whether or not the address information of the received SA request packet has translated by the NAT device based on the notification from the proxy computer.

7. The computer system according to claim 5, wherein:
a lifetime is set for the set of the inbound SA candidate information and the outbound SA candidate information; and
the second processor is further configured to delete from the second memory the set of the inbound SA candidate information and the outbound SA candidate information when the set has passed the lifetime.

8. A computer, comprising:
a processor;
a memory; and
an interface connecting the computer to a network, wherein:
the processor is configured, when the computer receives a SA request packet for requesting to establish a security association with a different computer, to determine whether or not the computer can communicate with the initiator of the SA request packet without an intervening NAT device, create a set of inbound SA candidate information designating an inbound safe communication path, in which address information of a source remains unknown, and outbound SA candidate information designating an outbound safe communication path, in which address information of a destination remains unknown based on the received SA request packet, and store the created set of the inbound SA candidate information and the outbound SA candidate information on the memory, upon determination that the computer cannot communicate with the initiator of the received SA request packet without an intervening NAT device; and
the processor is further configured, when the computer receives an encrypted packet which is encrypted according to the established security association, to decrypt the encrypted packet by using the inbound SA candidate information, create a set of inbound SA information and outbound SA information, by designating the address information of the source of the inbound safe communication path and the address information of the destination of the outbound safe communication path based on the set of the inbound SA candidate information and the outbound SA candidate information and source address information of the encrypted packet, and store the created set of the inbound SA information and the outbound SA information on the memory for successive safe communications with the first processor, upon successful decryption of the encrypted packet.

9. The computer according to claim 8, wherein the processor is further configured to create the set of the inbound SA information and the outbound SA information based on the received SA request packet upon determination that the computer can communicate with the initiator of the SA request packet without an intervening NAT device.

* * * * *